US005559693A

United States Patent [19]

Anick et al.

[11] Patent Number: 5,559,693

[45] Date of Patent: * Sep. 24, 1996

[54] METHOD AND APPARATUS FOR EFFICIENT MORPHOLOGICAL TEXT ANALYSIS USING A HIGH-LEVEL LANGUAGE FOR COMPACT SPECIFICATION OF INFLECTIONAL PARADIGMS

[75] Inventors: Peter G. Anick, Marlboro; Suzanne O. Artemieff, Concord, both of Mass.

[73] Assignee: Digital Equipment Corporation, Maynard, Mass.

[ * ] Notice: The portion of the term of this patent subsequent to Jul. 12, 2011, has been disclaimed.

[21] Appl. No.: 723,145

[22] Filed: Jun. 28, 1991

[51] Int. Cl.$^6$ .......... G06F 17/27; G06F 17/28

[52] U.S. Cl. .......... 364/419.08; 364/419.02

[58] Field of Search .......... 364/419, 419.02, 364/419.04, 419.08, 419.11, 419.13, 419.19

[56] References Cited

U.S. PATENT DOCUMENTS

| | | | |
|---|---|---|---|
| 4,439,836 | 3/1984 | Yosida | 364/419.02 |
| 4,594,686 | 6/1986 | Yosida | 364/419.13 |
| 4,641,264 | 2/1987 | Nitta et al. | 364/419.04 |
| 4,862,408 | 8/1989 | Zamora | 364/419 |
| 4,864,501 | 9/1989 | Kucera et al. | 364/419.08 |
| 4,887,212 | 12/1989 | Zamora | 364/419 |
| 5,099,426 | 3/1992 | Carlgren et al. | 364/419 |

*Primary Examiner*—Gail O. Hayes
*Assistant Examiner*—Charles R. Kyle
*Attorney, Agent, or Firm*—Kenyon & Kenyon

[57] ABSTRACT

A language syntax defines statement forms for statements that describe the inflectional morphology of the natural language. A set of language statements that follow the language syntax to describe the inflectional morphology of the natural language is accepted as input into to a computer. Rule statements define a set of morpho-syntactic features corresponding to grammatical distinctions within the parts of speech categories in the natural language and define a set of inflectional morphological paradigms. The inflectional morphological paradigms include form rule statements to describe the construction of word forms and associate with each construction pre-selected morpho-syntactic features.

18 Claims, 17 Drawing Sheets

METHOD AND APPARATUS FOR EFFICIENT MORPHOLOGICAL TEXT ANALYSIS USING A HIGH-LEVEL LANGUAGE FOR COMPACT SPECIFICATION OF INFLECTIONAL PARADIGMS

FIELD OF THE INVENTION

This invention relates generally to the fields of information management and data processing and, more particularly, to the field of natural language processing, applied in information management and data processing systems.

BACKGROUND OF THE INVENTION

There is great interest in applying the principles of morphology to problems in natural language processing in the fields of information management and data processing. Morphology is that part of linguistic study which is concerned with the formation of words in a natural language (such as English, French, German or Russian). It is the study of what people do everyday to form words in speech and writing. Of interest is how words are formed to provide meaning in different grammatical contexts.

People communicate by organizing words into larger structures like phrases, clauses, sentences and paragraphs, according to the accepted grammatical, syntactic and spelling conventions of a given natural language. The grammar of a language, groups words into categories that denote the principal parts of the language (or parts of speech), such as nouns, verbs, adjectives and adverbs. Within each part of speech category, a word can have one of several possible inflections, each marking distinctions in use such as gender, number, tense, person, mood or voice. A word, of course, can be used in more than one part of speech. When a word is used in a sentence, it appears in an inflected form that evokes the general meaning of the word and also marks some of the grammatical distinctions in use. For example, the idea of existence or "being" is conveyed in the different forms of the verb "to be". In these sentences:

I am tall.

She is taller.

We are the tallest people in the room.

the different inflected forms of the verb "to be" convey the idea of "being", tailored to the different subjects (e.g., first-person singular, second-person singular, first-person plural) and a tense (e.g., present tense) of the verb. Thus, a word is represented in a language through the collection of inflections, used to denote meaning as applied in a particular grammatical context. Some languages are more highly inflected than others. In English for example, word order (i.e., syntax) is a dominant factor in determining meaning, and, correspondingly, English words appear in only a relatively few number of inflected forms. In comparison, languages such as German place less importance on word order and, correspondingly, rely more on word form. Words in those languages have many more inflections. Inflectional morphology is the study of the different ways in which word forms are constructed in each language.

Morphology employs terms to formally describe the systems of construction that people use to form words in a natural language. Each construction of a given word is called a form, and a form encountered in a passage of text is called a surface form. The entire set or family of forms for a given word is called a lemma. Each lemma is identified by one form from its family (such as the form commonly found in a dictionary) called a citation form (and sometimes called a canonical form).

The words in any language are formed according to an inflectional morphology, which is defined to be the alteration of a basic word form to express the grammatical distinctions of a word within its part of speech category. Alteration is generally defined to mean the concatenation of one or more affixes to a primary or base word form called a stem. A stem is a group of characters, which roughly corresponds to the citation form of a lemma and evokes the primary meaning of the word. Affixes are a small, closed class of character strings, which are added to a stem either as a prefix or a suffix. Affixes have a systematic grammatical effect, when combined with a stem, that provides an indication of that word form's part of speech category and inflectional characteristics. The indications that denote part of speech and specific inflectional characteristics are called the morpho-syntactic properties of a word.

When people speak or write in a natural language, they instantly form words for a given grammatical context, because they have learned (usually as children in grammar school) that most words inflect according to a number of grammatical construction and spelling rules. The rules for constructing word inflections are systematic and generally apply to a large number of words within a grammatical category. Commonly available grammar books tend to group the words which inflect by the same rules, such as noun declension and verb conjugation groups, often illustrating the rule with examples of a typical word, such as this exemplary description of the rule for French second conjugation verbs:

Rule: To write the present tense of French verbs whose

| infinitive form ends in "ir" (such as the verb réussir), take the stem (réuss) and add the following endings: | |
|---|---|
| 1st person singular | je réusslis |
| 2nd person singular | tu réusslis |
| 3rd person singular | il/elle réusslit |
| 1st person plural | nous réusslissons |
| 2nd person plural | vous réusslissez |
| 3rd person plural | ils/elles réusslissent |

See, e.g., Nebelad and Frederich, *French Grammar*, Monarch Press, (New York, 1971). A grammar book table, such that above, includes the construction of an intermediate form stem from the infinitive form of the verb (réuss), a set of suffixes to add to this intermediate stem, and a set of grammatical features (morpho-syntactic properties) that correspond to the resulting word forms. A system of grammatical construction rules that apply to a number of words, such as the group of French second conjugation verbs, is called an inflectional paradigm. By associating a word with an inflectional paradigm, people can create inflected forms for that word, using its construction rules.

In addition to inflectional paradigms, word formation in any language is also governed by a number of orthographic rules. These spelling rules differ from the inflectional paradigms for grammatical construction, because their application is not based on any grammatical purpose. Grammatical construction rules, such as the paradigm to conjugate the present tense forms of the French verb réussir shown above, aid in forming inflections with distinct morpho-syntactic properties. Orthographic rules, on the other hand, are used to make a word conform to certain phonetic or other conventions, apart from grammatical considerations. Moreover, orthographic rules may apply across different grammatical paradigms.

For example, when adding an "s" to a word ending in "y" in the English language (e.g., "fly" or "army"), there is a spelling rule to follow: change the "y" to "i" and add "es" (e.g., "flies" or "armies"). That rule generally applies in both pluralizing nouns and conjugating verbs. In the French language, an orthographic rule governs the phonetic softening of the letter "c" as it appears in words, at times replacing the "c" with a cedilla "ç". If the "c" appears in a French word form and is followed by the letter "a", "o" or "u", a cedilla must be used, as in the noun form le garçon and the present tense first person plural form of the verb nous plaçons. In such cases, both the inflectional paradigm form construction rule and the orthographic rule govern the formation of the inflected form.

In any language, some word forms are exceptional and do not inflect according to any paradigm. People simply learn these irregular inflections, as for example, the conjugations of the present tense forms of the French language verb être:

| | |
|---|---|
| 1st person singular | je suis |
| 2nd person singular | tu es |
| 3rd person singular | il/elle est |
| 1st person plural | nous sommes |
| 2nd person plural | vous êtes |
| 3rd person plural | ils/elles sont |

In English, everyone knows that nouns are pluralized by adding an "s", but there are many fish, many sheep and many other groups of words to which neither a grammatical paradigm nor an orthographic rule applies.

People who are familiar with a natural language are generally skilled in using the inflectional paradigms and spelling rules (usually learned in grammar school). They are quick to recognize and form words within a grammatical context by manipulating inflectional paradigms and spelling rules and, when necessary, remembering the exception forms. For example, when a person comes upon a word in a book that she does not know, she must manipulate the word form found in the text, and determine a corresponding citation form, in order to look up the word in a dictionary. Even an unabridged dictionary for a given language does not list and define every inflection of every word. Rather, dictionaries generally provide a single entry for each word, identifying each entry with only the citation form. For example, the citation form for English verbs is the infinitive form; for English nouns it is the singular form. With each citation, the dictionary provides, in addition to the citation form, information on a word, such as its part of speech characteristics, a definition and some inflectional variants of the word. Thus, a dictionary is a source for all basic forms of a word, but only the basic forms. Morphologists define a lexicon to be a source of basic word forms, such as an unabridged dictionary. With a lexicon and a set of paradigms a person can inflect all of the possible word forms. People can inflect forms for even unfamiliar words, if they know that the unfamiliar word inflects according to a known paradigm.

Moreover, people easily remember and use the grammatical construction and orthographic rules, because the construction rules they have learned (usually in grammar school) capture the linguistic generalities of a natural language. Orthographic rules are not specific to inflectional paradigms, but rather apply across paradigm boundaries. In some cases, a given orthographic rule applies only to a subset of all the words which otherwise fit the context specified by the orthographic rule. In such cases, information must be remembered (or looked up in a dictionary), to indicate whether particular inflections adhere to an orthographic rule. Additionally, the concept of word formation using inflectional paradigms, based on the taking of a base form of a word (such as a citation form), and creating an intermediate stem form to which affixes are added, applies across all paradigms. Those rules for constructing forms can be reused, as a general matter, to generate forms within the same paradigm, and sometimes in different paradigms. Thus, by reducing the myriad inflected forms down to a relatively small number of form instruction techniques, applicable across different paradigms and orthographic rules, the linguistic generalities inherent in any natural language may be captured in a way that helps people master the language.

In the fields of information management and data processing, applications have been developed to perform morphological analysis on a natural language text, attempting to replicate the functions that people do everyday. There are many applications where the ability to manipulate word forms while maintaining data on the morpho-syntactic properties as people do is important and useful. For example, morphological analysis has been used in information retrieval systems, where the words of a text file are indexed by the citation form of a word or some partial stem. In those systems, a text file search is performed by deriving a citation form or stem form of the word, and searching for entries under that citation form index. Manipulation of word forms is also important in on-line dictionary and thesaurus systems, where a word form is provided and a dictionary entry is retrieved by generating an associated citation form or other lemma indicator. In other systems, tracking the morpho-syntactic properties of a word is also important. For example in database systems that permit queries in a natural language (where the meaning of the words in a query is important), morphological text analysis has been used to process them by taking each surface form found and generating a citation form or lemma identification for the word and the corresponding morpho-syntactic properties. Maintenance of morpho-syntactic information is also important in machine translation systems (in which text passages are translated from one natural language to another), where a surface form in one language is found in a passage and translated to another language in a form having the same morpho-syntactic properties.

Generally, a computer-based system for morphological analysis of text begins with a lexicon (i.e., a set of base word forms) associated with a set of form construction rules. The hope is to build a system to do some of the things people do almost automatically: inflectional recognition and inflectional generation. Inflectional analysis is the process of taking a word form as it appears in text (i.e., a surface form), recognizing or deriving the morpho-syntactic properties of that form, and locating its family of word forms (i.e., lemma). Inflectional generation is the process of generating a particular surface form with specific morpho-syntactic properties, given a citation form in a lexicon and a set of construction rules. Additionally, there has been effort to design in an elegant way the system for morphological analysis. If possible, the design of the morphological system should support multiple natural languages.

In addition, the programming or specification of the inflectional language should be easily accomplished. If possible, the specification should follow as closely as possible the easily understood system of using grammatical rules and spelling rules, (found commonly in grammar books) and applying them to basic forms found in a lexicon source (usually the dictionary). That way anyone familiar with a natural language, not exclusively those versed in computer programming techniques, could specify a description of a language's inflectional morphology and build a system. Additionally, if the method for specifying a description of the inflectional morphology and the lexicon of a natural language permitted a compact description, there would be no maintenance problem in adding new words to the lexicon and associating them with appropriate grammatical and spelling rules. However, the currently available systems for morphological analysis present incomplete and non-elegant solutions to the problem of providing morphological text analysis in information management and data processing systems.

In terms of functionality, some of the currently available systems cannot be used for both inflectional recognition and inflectional generation. And in terms of system design, the currently available systems generally use non-elegant, highly contrived linguistic formalism to describe the inflectional morphology of a given natural language, that neither take advantage of the linguistic generalities that are inherent in the language, nor provide systems that map well to the morphological specifications found in grammar books. Such systems can have serious practical drawbacks. For example, some of the currently available systems for morphological analysis incorporate a design that does not use paradigms. Where no paradigms are used, all linguistic generalizations are lost and updating the lexicon with additional words becomes a burdensome process. Other systems employ paradigms which consist of highly artificial construction rules. These systems have serious practical drawbacks, because they do not incorporate features to take advantage of linguistic generalizations inherent in the language.

As discussed above, people remember paradigms for grammatical construction separate from orthographic rules that sometimes apply across paradigms. Moreover, because many paradigms differ in construction rules for only a few forms, paradigms can be arranged in hierarchies where the form construction rules of a "general" paradigm can be reapplied in other paradigms with certain exceptions. Thus, paradigms could be specified to inherit form rules of other paradigms. The use of features such as the specification of orthographic rules, separate from the paradigm, and paradigm inheritance of form construction rules, would enable a system to be created that would map well to grammar books, and would permit easy specification and updating by anyone familiar with the language. However, to date the presently available systems have yet to create an elegant solution. For example, even in those currently available systems where orthographic rules are separated from form construction rules, the user must explicitly specify links to the orthographical rules, or the user must transform each lexical entry into some equivalent but highly artificial lexical representation, to provide a link to an orthographic or spelling rule—both being non-trivial burdens on the users who maintain the system and populate it with new words.

Moreover, some of the formalistic design choices used in presently available systems prevent them from being used with multiple languages. In some systems, an artificial approach is taken for a specific language like English (which is not highly inflected) that is useless in creating a system for languages like Russian or German (which are both highly inflected). In other systems, the syntactic and grammatical features are hard-coded so that new code must be generated and adjustments must be made in the system for each new language.

Thus, there is a need for a system to perform morphological text analysis which provides the functionality of both inflectional recognition and inflectional generation and also incorporates design features that would take advantage of the linguistic generalities found in many languages. The creation of such a system would be a great advance to the field of information management and data processing.

SUMMARY OF THE INVENTION

The present invention provides a method and apparatus that can be used with a computer to perform functions of morphological text analysis, incorporating a design that supports multiple natural languages and enables users to specify the language description in compact terms that map well to grammar book descriptions. The invention comprises an M language syntax, used in specifying a description of the inflectional morphology of a natural language and a compiler module, used by a computer processor to transform the user-specified language description into data structures that are to be used by the computer to perform the functions of morphological analysis lexicon. The present invention can be arranged to perform the functions of morphological analysis as part of a larger computer system in the information management and data processing field where morphological analysis is required, such as, for example, in a database text retrieval system or machine translation application.

In a rule specification phase, the present invention provides to the user the ability to specify a description of a natural language using the syntax of the M language. The syntax of the M language takes advantage of the linguistic generalities inherent in a natural language, permitting the user to express rule-sharing relationships between inflectional paradigms, express generalizations over word forms, as well as share separately declared orthographic rules between paradigms. The rule statements can be specified by the user in a compact way that maps well to the language descriptions commonly found in grammar books. With the present invention, maintaining the lexicon and the language description is not a burdensome process, and can be performed easily by one who is acquainted with language. In a compilation phase, the compiler module, comprising executable program statements and data structures, enables a computer processor to read the compact, text-book like language description and produce from it a data structure that can be used for computer-based morphological processing. In a process that is invisible to the user, the compiler module integrates the language constructs by arranging the form rules of each paradigm into a hierarchical transition network through the processes of "disambiguation," and "form rule inheritance" which expands form sets into equivalent sets of rules, making entry points into the corresponding lexicon from lexical stem references in the form rules and "conflating" possible spelling form variations into the form rules after matching the form rules to the orthographic rules based on operator affix and context. The process of "conflating" involves the automatic creation of additional variant form rules to map the application of a spelling rule to a given form construction rule. Additionally, the compiler module enables the computer processor to construct a discrimination net which is used in the process of morphological recognition.

The functions of inflectional recognition and generation are performed by the recognition and generation modules of the present invention: each is comprised to use the data structure of the described rules and the lexicon.

All aspects of the present invention will be described in detail below.

BRIEF DESCRIPTION OF THE FIGURES AND APPENDICES

APPENDIX I Lists an exemplary formal syntax for the M language of the present invention;

APPENDIX II Lists an exemplary set of user prepared declarative rules for the German language;

APPENDIX III Lists an exemplary set of user prepared declarative rules for the French language;

APPENDIX IV Lists an exemplary algorithm for the compilation module of the present invention;

DETAILED DESCRIPTION

Figure 1:
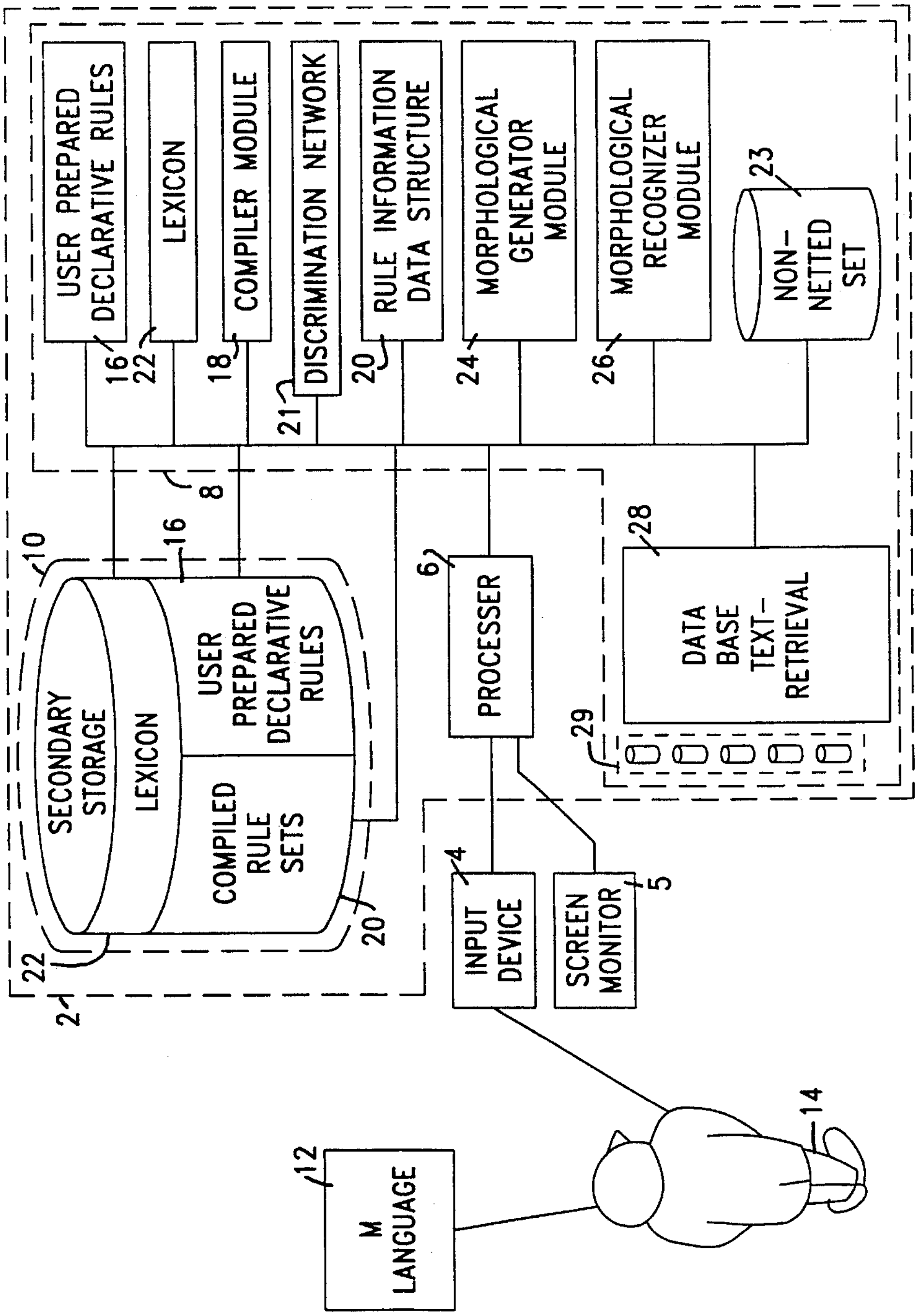
FIG. 1 Depicts an exemplary embodiment of the data structures and computer program modules of the present invention as used in conjunction with a database text retrieval system.

FIG. 1 depicts an exemplary embodiment of the data structures and computer program modules of the present invention. A computer system is provided comprising a computer 2 coupled to an input device 4, such as a keyboard, and a display device, such as a monitor 5. The computer 2 comprises a processor 6 that is coupled to the input device 4, the monitor 5, and two storage devices, a main computer memory 8 and a secondary storage device 10. The processor 6 is configured to accept input from the input device 4, store input in either computer memory (8 or 10), and create and execute morphological analysis programming, using the data structures and program modules provided by the present invention. Although the present invention can be implemented on any computer system, in an exemplary embodiment of the present invention, a VAX 6000-410, manufactured by the Digital Equipment Corporation, configured to process using the VMS operating system, also manufactured by the Digital Equipment Corporation, provides the platform for the morphological text analyzer of the present invention. For more information on the 6004-010 and the VMS operating system, the reader is referred to the following publications: VMS User's Manual, Order Number: AA-6A 98B-TE, VMS Media and Extended Documentation Kit, Order Number: QA-001AA-H5, Digital Equipment Corp., Maynard, Mass.

Although the data structures and computer program modules of the present invention will be described in detail below, a brief overview of the system can be described as illustrated by FIG. 1. The present invention provides three operation phases: a rule specification phase, a compilation phase, and a run-time phase. In the rule specification phase, a user 14 employs the syntax of the M language 12 to specify, using the input device 4, the description of the inflectional morphology of a natural language, such as German or French. Additionally, the user stores in a database the word information entries that comprise a lexicon 22 that will be used in conjunction with the description of the inflectional morphology. The features of the M language 12 and the lexicon 22 are described in detail below. As input comprising statements of the M language 12 is accepted by the processor 6, it is first stored in the main computer memory 8 (while the user completes or edits his or her specification) and then stored in the secondary storage area 10 (until the compilation phase). The word forms and accompanying information contained in the lexicon 22 are also stored in the main computer memory 8 (during the specification phase) and then moved to secondary storage 22 (until the run-time phase).

In the compilation phase, a compiler module 18, comprising executable program statements and data structures, is used by the processor 6 to read the set of user prepared declarative rules 16 and produce from it a data structure comprising a rule information data structure 20. This data structure is used by the processor 6 in the run-time phase to perform the functions of morphological generation and recognition. Additionally, the morphological recognition module uses two additional data structures, a discrimination net 21 and a non-netted table 23.

The result of the compilation process is the creation of a computer-manipulatable data structure that can be used, with a lexicon to perform morphological processing. The data structure includes chains of form rules indexed by paradigms. As the form rules of one paradigm can be inherited by another, the present invention provides that associated with each form rule is the list of paradigms that "share" the form rule. Also associated with each form rule is a list of the morpho-syntactic properties of the form. Further, should an orthographical rule apply to a particular form rule, the present invention provides that "variant" form rules be associated with each form rule in the data structure, to enable the application of the orthographic rules in specific circumstances. The distinctive aspects of the compiler 18 module 18 and the compiled rule set data structure 20 are described more fully below.

In the run-time phase, the executable program statements comprising a morphological generator 24 are used by the processor 6 to perform the function of morphological word form generation. As stated above, morphological generation involves the process of generating word forms, given a lexicon and a compiled rule set to guide the generation of word forms. The computer program statements of the morphological recognizer 26 are used by the processor 6 to perform the functions of morphological recognition. As stated above, morphological recognition entails the function of identifying one or more instances of a set comprising the word form, a paradigm identifier, a set of morphosyntactic properties, and a corresponding lemma (i.e., lexical entry) for "guessing" for a given surface form. The statements of the morphological recognizer 26 enable the processor 6 to identify the lemma and the morpho-syntactic properties indicated by the surface form.

As stated above, the method and apparatus for morphological text analysis of the present invention has wide application in devices for information management and data processing fields, such as in machine translation systems, natural language processing systems, as well as on-line dictionary, grammar checking, and thesaurus systems. In an exemplary embodiment, FIG. 1 depicts the data structures and computer program modules of the present invention as used in conjunction with a run-time database text-retrieval module 28. In the exemplary embodiment, the processor 6 is connected to the run-time database text-retrieval module 28 and a plurality of database text files 29, comprising natural language text. Each surface form in the text is indexed according to its citation form. In such a system, the processor 6 prompts the user for a query, using the executable program statements comprising the database text retrieval system and generates calls to either the morphological generator 24 or the morphological recognizer 26. For additional information on aspects of an indexed database retrieval system, the reader is referred to co-pending U.S. application Ser. No. 07/723,229, issued as U.S. Pat. No. 5,251,316, entitled "Method and Apparatus for Integrating a Dynamic Lexicon into a Full-Text Information Retrieval System", filed on even date herewith, and U.S. application Ser. No. 07/472,245, entitled "A Direct Manipulation Interface for Boolen Information Retrieval", filed on Jan. 30, 1990 which are both expressly incorporated herein by reference. The description now to follow will describe in detail the features of the present invention as outlined above.

MORPHOLOGICAL RULE SPECIFICATION

The M language 12, as stated above, enables the user 14 to specify a set of declarative rules 16 that describe the inflectional morphology of a given natural language. To write the description, the user 14 is provided with a syntax that will dictate the form and sequences of a set of declarative statements to describe the inflectional morphology of a natural language. APPENDIX I lists the formal syntax for the M language 12. This syntax enables a user to capture the linguistic generalities inherent in natural languages, because it permits: 1) the specification of a hierarchy of paradigms, where each sub- paradigm inherits the features and form construction rules of its parent; 2) the separate specification of orthographic rules, which include sets and variables, that apply across inflectional paradigms; 3) the use of intermediate and surface form rules; 4) the specification of features which describe the morpho-syntactic properties associated with a form construction; 5) the ability to override intermediate form rules (as well as surface forms) in certain exceptional cases with entries in the lexicon; 6) the ability to declare affix variables (which will be described below); and 7) the ability to use form sets (also described below) in presenting a declaration. With the M language 12, the user 14 can specify a compact morphological description that maps well to a description found in grammar books, and thus mastery of the M language 12 syntax does not require a degree in computer science, only mastering of the basic grammatical and orthographical rules of a natural language. The user 14 who builds the description can be any person well-versed in natural language, such as a professor or a writer, APPENDICES II and III list partial descriptions of a set of user declared rules 16 for the German and French languages, respectively. Various aspects of the M language 12 syntax will now be discussed with reference to examples appearing in those appendices.

The user 14 specifies a set of prepared declarative rules 16 that provide a morphological description of a natural language, using the set of M language 12 statements, organized into a set of input data called a rule set. A rule set includes a declaration of a rule set name and a set of elements including paradigms and orthographic rules as follows. An M language 12 paradigm declaration has the following exemplary form:

```
paradigm: <name> {
    based_on: <parent-paradigm>
    use_for_instances: <true/false>
    acquisition_form: <form-name>
    exemplar: <example>
    form_sets {
        <form-set-name> = (<form-list>)
        <form-set-name> = (<form-list>)
    }
    affix_vars {
        <affix-var-name> = (<affix-list>)
        <affix-var-name> = (<affix-list>)
    }
    intermediate_forms {
        <form-name>: <form-body> [<feat-spec>]
        /<qualifiers>
        <form-name>: <form-body> [<feat-spec>]
        /<qualifiers>
    }
    surface_forms {
        <form-name>: <form-body> [<feat-spec>]
        /<qualifiers>
        <form-name>: <form-body> [<feat-spec>]
        /<qualifiers>
    }
    form_features {
        <form-name> [<feat-spec>]
        <form-name> [<feat-spec>]
    }
}
```

Each paradigm is identified by a name and contains a number of sub-declarations. The basic components of the paradigm declaration are the form construction rules. The present invention provides for surface form rules (which describe the construction of forms that appear in text) and intermediate forms rules (which describe the construction of forms which may never appear in text, but which are useful, because they are basic forms used as steps in the construction of surface forms. In addition, the present invention provides for the declaration of a lexical form, which is stored directly in the lexicon, but which is referenced in the paradigmatic form construction rules by the "LEX" identifier, as will be described below.

A form rule in the M language 12 declaration comprises a left-hand-side (LHS) <form-name> which can be any indicator of a particular inflection, such as "prés-1s," or a simple identifier such as "X", and a number of right-hand-side (RHS) components. The right-hand-side <form-body> may assume one of several formats, as follows:

```
<form-op>          <affix>          <stem>
                     or
```

-continued

| | | |
|---|---|---|
| <stem> | <form-op> | <affix> |
| | or | |
| <stem> | | |
| | or | |
| LEX | | |
| | or | |
| NIL | | |

Where <form-op> is either a plus (+) or minus (–), indicating whether the affix is being added or removed; <affix> is either a string (enclosed in quotes) or the name of an affix_var (to be described below); and <stem> is the name of a form_set or form that resolves in one or more steps into a stem in the lexicon (i.e., a form that was generated from a form the <form-body> of which comprises LEX). NIL, used only in paradigms that inherit forms from a parent paradigm, indicates that the given form does not exist in the current paradigm. An example use would be for the French verb pleuvoir, which exists only in the third person singular. Its other forms would have a NIL value. Thus, the form construction rules of both surface and intermediate forms distinguish between two major categories of strings: stems, which are any forms which include the primary lexical base of the word, and affixes, which comprise the prefixes and suffixes which can be appended to a stem in the process of word formation. Once an affix is appended to a stem, however, the result is also a stem, since the result also includes the primary lexical base.

Examples of surface and intermediate form rule declarations for the French language in APPENDIX III are found in the paradigm named "verb_root":

```
Intermediate_forms {
    BASE: Inf – "IR"
Surface_forms {
    inf : LEX
    prés_1s: BASE + "E"
. . .
```

Notice that the surface form rule (prés_1s) is formed by taking a stem (BASE) and concatenating it with the affix ("E"). The present invention provides for the chaining of form rules: the stem (BASE) in the form rule is the identifier of an intermediate form rule (BASE), which is formed by taking a stem (inf) and stripping the affix ("ir") from it. The stem (inf) also identifies a surface form rule (inf). The right-hand-side (RHS) of the infinitive form is a (LEX) indicator which indicates that the form (inf) is constructed by accessing the lexicon 22 (FIG. 1) and locating a citation form. Thus, in the construction of the form (prés-1s) there is a chain (prés-1s) to (BASE) to (inf) to (LEX). This chaining of form rules from right-hand-side stem to left-hand-side form name permits a compact description of the language that maps well to grammar book descriptions.

Associated with each surface form is a set of one or more features that provide a description of the morpho-syntactic properties of that surface form. The M language 12 permits the specification of features with the <feat-spec> declaration as follows:

<feat>=<value>

The <feat-spec> declaration comprises a number of feature-value pair specifications, where <feat> is an identifier of the feature and the <value> is the value for the feature. An example of a set of feature value pairs for the form rule (prés_1s) appears in the paradigm (verb_root) in the French language user prepared declarative rules 16 listed in APPENDIX III:

```
form_features{
    prés_1s: temps = présent, personne = 1, nombre = singular
. . .
```

The example contains a set of three form/feature pairs that are associated with the form rule (prés_1s). Each feature identifier (temps), (personne) and (hombre) describes the category of morpho-syntactic properties used by the associated form. The value declarations (e.g., present) provide specific morpho-syntactic properties for the form within the feature category. The feature/value pairs are associated with a form construction rule through the shared use of the same left-hand-side identifier (e.g., prés_1s).

As can be seen from the example above, the M language 12 syntax provides for form-features to be declared apart from the form rule in a form-feature declaration. To link the form-feature to a form rule, in such a case, form/feature pairs can be declared, as in the example using the form name with which it is to be associated. However, it is also possible that the form features be declared in the form rule itself as in the example found in the user prepared declarative rules 16 for the German language in APPENDIX II. The paradigm verb_strong_pref has the following declaration:

```
surface_forms{
    finite_unattached: FINITE [unattached = true]
```

where unattached=true is the feature-value pair. The two declaration areas in the paradigm are provided merely for convenience, as sometimes it is more convenient (and more readable) to list the sets of feature-value pairs associated with a form in a separate section when there are many feature-value pairs. The format of the <feat-spec> is identical, regardless of whether it is placed within the form rule or in the form_features section.

Additionally, multiple sets of feature-value pairs may be used for those cases where there is a single surface form for multiple "paradigm locations," e.g., in English we might have the following forms:

```
inf: LEX
pres_3s: inf + "s"     [tense = present, person = 3, number =
                       singular]
pres: inf              [tense = present, person = 1, number =
                       singular;
                       tense = present, person = 2, number =
                       singular;
                       tense – present, person = 1, number =
                       plural;
                       tense – present, person = 2, number =
                       plural;
                       tense – present, person = 3, number =
                       plural;]
```

where the infinitive form (inf) is used in the right-hand-side of many different form rule constructions. In the exemplary embodiment of the present invention, form features used in a given rule set are specifically declared and a range of values must be assigned to each form-feature. Thus, in the paradigm, <feat> must have been previously declared in a separate feature values section and <value> must be one of the previously declared values for the given feature. Feature values are declared separately from paradigms as follows:

```
feature_values {
        <feature> = (<value-list>)
        <feature> = (<value-list>)
    }
```

Where <value-list> represents a value followed by zero or more occurrences of a comma followed by another value. One or more features may be declared in this manner. An example in the English language is: tense=(present, past, future). In APPENDIX II there appears the following feature value set declaration from the user prepared declarative rules 16 of the German language:

```
feature_values{
    tense = (present_indicative, imperfect, present_subjunctive,
        special_subjunctive, past_participle)
    person = (1, 2, 3)
    number = (singular, plural)
    non_finite = (true, false)
    unattached = (true, false)
```

The left-hand-side of each declaration identifies the category of morpho-syntactic property with which a word form can be identified (e.g., tense) The right-hand-side provides a set of possible values over which the feature identifier may range (e.g., the person category can be either first person, second person or third person.

Referring again to the declarations of surface and intermediate form rules, the <form_body> and <feature-spec> declarations, a RHS argument of a form rule may in addition, contain one or more qualifiers. Qualifiers are used at run-time to indicate that a given lemma may override the given (intermediate) form rule with a string stored in the lexicon. The present invention provides an exemplary override statement:

```
allow_lexical_override
```

This is used to indicate that the given form may be overridden by a stem in the lexicon; in the exemplary embodiment, it is used only for intermediate forms, as any surface form may be overridden by a lexical entry. For example, in APPENDIX III there appear the following forms in the paradigm verb_root:

```
Intermediate_forms{
    . . .
        FUT: inf        /allow_lexical_override
}
surface_forms{
        inf: LEX
```

In constructing the form (FUT) for a given lemma, the syntax of the M language 12 dictates that the lexicon 22 first be searched to determine if there is a (FUT) entry for that lemma before the form rule (inf) is accessed to construct the form. If there is a form FUT in the lexicon 22 for a given lemma, that form will be used instead of following the inf construction chain, thus, allowing the lexicon form in that case to "override" the normal construction rule. If no FUT form appears in the lexicon 22 for the given lemma, the processing will continue using the form rule (inf).

As mentioned above, the present invention provides for a hierarchical organization of paradigms, whereby one paradigm may inherit some or all of the form construction rules of another paradigm. The "based-on" declaration (shown in the general paradigm declaration above) indicates the name of the paradigm from which the given paradigm inherits its rules. If the current paradigm is not based on any other paradigm, then that line is omitted. In the compilation phase, the processor 6 (FIG. 1) uses the compiler module 20 (FIG. 1) to process the statement based-on as a signal to incorporate form rules from the parent paradigm into the current paradigm according to the method of the present invention.

It is the left-hand-side of the form rule, i.e. the form-name, which governs which rules are inherited from a parent paradigm. Only those rules with form names that do not exist in the child paradigm are inherited from the parent. One can think of the rules in the child paradigm as overriding rules with the same form name from the parent paradigm. The ability to inherit an override not only in surface forms but also intermediate forms (without requiring the restatement in the child paradigm of rules that use an overridden intermediate form but otherwise behave just like the parent rules) can greatly simplify and condense the rule set that a user need develop to describe a natural language such as French or German.

In addition, the present invention provides in a paradigm declaration two additional features for a compact description of an inflectional morphology: form sets and affix variable sets. Form sets represent a short-hand notation that sometimes can be used to declare a set of similar forms. Within a paradigm declaration, the M language 12 syntax provides that the form sets be declared as follows:

```
form_sets {
    <form-set-name> = (<form-list>)
    <form-set-name> = (<form-list>)
}
```

where the <form-set-name> identifies the form set specified on the right-hand-side. The <form-list> is a list of one or more of the form-names declared in the following sections or inherited from the parent paradigm, each separated by a comma. A typical declaration appears in the paradigm provided in the user prepared declarative rules 16 for the German language in APPENDIX II.

```
form_sets {
    FINITE = (pres_1s,pres_2s,pres_3s,pres_1p,pres_2P,
    pres_3p,imp_1s,imp_2s,imp_3s,imp_1p,imp_2p,imp_3p)
}
```

There are cases in which a set of forms (instantiated by different strings and referring to different values of the same set of features) exhibit the same behavior with respect to form construction rules that use them to create new forms. In such cases, it may be useful to define a form set name to serve in form construction rules as a placeholder for any one of a set forms. The present invention allows one to define such a form set and use it wherever a stem can appear in the right-hand-side of a form rule, such as, for example, the declaration using the form set FINITE in the German language paradigm verb_strong_pref of APPENDIX II:

```
surface-forms {
    finite-unattached: FINITE [unattached = true]
```

In the compilation phase, the processor 6 will take each form rule accessing a form set and "conflate" it with the members of the form set to create a new set of form rules, each having as features the union of features associated with the original form rule and the form set member. For example, the form finite-unattached.prés_1s, as described above, has the associated feature/value pair, personne=1, whereas the finite-unattached.prés_25 has associated with it the feature value pair personne=2. Representationally, the conflating process would yield:

```
surface-forms {
    finite-unattached . prés_1s = prés_1s [unattached = true]
    finite-unattached . prés_2s = prés_2s [unattached = true]
    finite-unattached . prés_3s = prés_3s [unattached = true]
    finite-unattached . prés_1p = prés_1s [unattached = true]
    finite-unattached . prés_2p = prés_2s [unattached = true]
    finite-unattached . prés_3p = prés_3s [unattached = true]
    finite-unattached . imp_1s = imp_1s [unattached = true]
    finite-unattached . imp_2s = imp_2s [unattached = true]
    finite-unattached . imp_3s = imp_3s [unattached = true]
    finite-unattached . imp_1p = imp_1s [unattached = true]
    finite-unattached . imp_2p = imp_2s [unattached = true]
    finite-unattached . imp_3p = imp_3s [unattached = true]
    . . .
```

A form whose derivation includes no form sets will be referred to as a "ground" form, since it always corresponds to a precise string with associated set (or sets) of feature values. A form constructed using a form set is known as a "variable form", since different instantiations of the form may correspond to different strings with different feature-value sets. Whenever a form set, or a variable form, is used in the right-hand-side of a form construction rule, the resulting left-hand-side form must be a variable form.

Form sets are a useful way of generalizing behaviors, since rules can be written which act on any of a set of forms, rather than requiring a separate rule to be written for each member of the set. However, it can also be useful to refer by name to the "ground" forms implied by a variable form. For this reason, the present invention permits a naming convention by which ground form names can be generated. It works as follows: the first time a form set is used to construct a variable form, the ground form names are the concatenation of the strings<variable form name>"."< form set member name>.

Affix variables (affix_vars) are similar to form sets in that the variable represents a part of the form that varies in a generalizable way. Declarations of affix variables are permitted in the M language 12 to handle special cases when there are a small, fixed class of affixes whose value must unify with a value stored in the lexicon, such as for words with seperable prefixes in German. However, in contrast to the form set whose scope is the part of the form that contains the lexical "stem", the affix variable ranges over a set of affixes. In APPENDIX II, an example of a declaration appears in the verb_strong_pref paradigm of the user prepared declarative rules for the German language:

```
affix_vars {
    sep_prefix = (ab,an,auf,ein,fort,heim,her,hin,mit,nach,
        nieder,vor,weg,zu,zurück,zusammen)
```

As used in a form rule, the affix variable can be used where an affix might appear in the right-hand-side, as for example in the German language paradigm verb_strong_pref of APPENDIX II where the surface form past_part is specified:

```
surface_forms {
    past_part: + sep_prefix p_part
```

The affix variable sep_prefix specifies a range of values that can be used in constructing the form past_part. The affix_var name (e.g., sep_prefix) is treated as a feature which can be turned on or off using a lexicon reference, while the <affix-list>, which represents a list of all the possible affix strings, is treated as the range of all affix values. A feature/value pair consisting of an affix variable name and value may be used as a constraint, by requiring it to unify with equivalent information stored in a lexical entry.

Referring again to the paradigm declaration above, the paradigm declaration also includes a use_for_instances field, which takes the value of "true" (or "yes") or "false" (or "no"). If the value is false or no, then the paradigm is used solely as a source for inheriting rules, i.e., there are no lemmas in the lexicon that are associated with the paradigm.

In addition to the declaration of paradigms, the present invention provides separate declaration syntax for orthographic rules. Orthographic rules are used to specify spelling changes that occur across paradigms and that are dependent on the orthographic or phonetic context, such as a silent "e" or accented final syllable, rather than on the specific grammatical construction patterns of a paradigm. Orthographic rules are declared as follows:

```
ortho_rules {
    <rule-type> (<parameter>) <lhs> → <result>
}
```

Where <rule-type> is either SUFFIX or PREFIX; <parameter> is the name of an orthographic feature, which may be prefixed by a tilde (~) to indicate negation; <lhs> is the left-hand-side of the rule; and <result> is the construction result that will occur when the rule applies. The form of the left-hand-side <lhs> of the orthographic rule is dependent on <rule-type>. In the case of a SUFFIX, the form of the rule is as follows:

```
[<context>]<rule-op>[<affix>]
```

Where <rule-op> is either a plus (+) or minus (–), to indicate whether the suffix is being added or removed; <affix> describes the orthographic constraints on any suffix satisfying the rule; and <context> describes the orthographic constraints on any stem satisfying the rule. The <affix>, <context> and <result> components each comprise a sequence (called an affix variable sequence) comprising any combination of literal strings (enclosed in quotes) and/or any variables declared in a VARS section, as is described below. The context and result sequences then become affix sequences in the form rule variants created during rule conflation. It is assumed that strings which match the <context>, <affix> and <result> components may extend beyond the specified segments, except in those cases of an affix literal value (i.e., a character or string of characters) that ends or begins in a pound sign (#), which indicates end of word for a suffix, or beginning of word for a prefix. For example, +["e"] [<context>] is interpreted as the addition of any prefix that ends with the letter e, whereas +["#ge"] [<context>] is interpreted as the addition of the prefix "ge."

As described above, the <context>, <affix> and <result> components in an orthographic rule declaration can contain character strings and/or variables. The M language 12 syntax provides that all variables used in the orthographic rules be previously declared in a separate declaration as follows:

```
vars {
    <set-name> <var-list>
```

-continued

```
       <set-name> <var-list>
}
```

Where <set-name> must be the name of a previously declared set (to be described below) and <var-list> represents the name of a variable followed by zero or more occurrences of a comma followed by the name of another variable. One or more var-lists may be declared in this manner. An example is:

VOWEL vow1, a_or_o, vow2.

where VOWEL identifies sets of characters or strings which must also be separately declared as follows. As used in the orthographic rule as an element in a <context>, <affix> or <result> sequence, the variables (vow1), (a_or_o), and (vow2) would be references to specific instances of members of the set VOWEL, i.e., variables which may be bound at run-time to one value of the VOWEL set. In the French language, for example, the user prepared declarative rules 16 in APPENDIX III, contain the following variable declarations:

```
vars {
    VOW              vowel
    GEM_CONS         gcons
    LETTER           char
    CONS             const
    E_I              e_or_i
    NON_E_I          a_o_u
    NON_E_VOWEL      non_e
    A_O              a_or_o
    T_CONS           c_d_t
}
```

As mentioned above the set names in the variable declaration are the identifiers of previously declared sets comprising characters and/or strings of characters. A set is specified in a declaration separate from the variable declaration and the orthographic rule declaration. Sets for use within orthographic rules are declared as follows:

```
sets {
    <set-name> = (<member-list>)
    <set-name> = (<member-list>)
}
```

where <member-list> represents a letter followed by zero or more occurrences of a comma followed by a letter. One or more sets may be declared in this manner. An example is: VOWEL=(A,E,I,O,U). In the user prepared declarative rules 16 for the French language, in APPENDIX III, the following sets are declared:

```
sets {
    LETTER = (A,B,C,C,D,E,F,G,H,I,J,K,L,M,N,O,P,Q,R,S,
        T,U,V,W,X,Y,Z,'A,É,'E,'E,Ê,Î,Í,Ô,Û)
    CONS = (B,C,C.D,F,G,H,J,K,L,M,N,P,Q,S,T,V,W,X,Z)
    VOW = (A,E,I,O,U,'A,É,'E,'E,Ê,Î,Í,Ô,Û)
    GEM_CONS = (L,N,S,T)
    E_I = (Ê,'E,É,I)
    NON_E_I = (A,O,U)
    NON_E_VOWEL = (A,A,I,O)
    A_O = (A,O)
    T_CONS = (C,D,T)
}
```

The set declaration provides a range of values over which the variables used in orthographic rules may range.

Referring again to the declarative form for an orthographic rule, if a given variable appears more than once within the orthographic rule, then the same value must be substituted for each occurrence. For example, the rule: PREFIX (GEM)+[vow1] [cons vow2]–>[vow1 cons cons vow2] means that when any prefix that ends in a vowel is added to a stem which has a positive value for the GEM parameter and begins with a consonant followed by a vowel, the consonant is doubled. Note also the use of vow1 and vow2 within the rule. The use of different variable names for the set of vowels indicates that they are independent of each other, i.e., the values need not be identical; although they may happen to be identical.

In the user prepared declarative rules 16 for the French language in APPENDIX III, there are many examples of suffix rules which use variables as affix and context components including:

```
ortho_rules {
    ! geminate the consonant preceding a mute-e syllable
    SUFFIX (GEM) [vowel gcons] + ["E#"] → [vowel
        gcons gcons "E#"]
    . . .
}
```

This orthographic rule provides for geminating certain consonants that precede a mute e where the word ends in the affix "e" and is preceded by a vowel and one member from the set of geminating consonants (GEM_CONS). The rule specifies that the geminating consonant is doubled where the context and affix of the left-hand-side occur. The variable (vowel) can range over the entire set of characters in the VOW set, and the variable (gcons) ranges over the values L,N,S,T in the set (GEM_CONS).

If the orthographic rule applies to a PREFIX, the rule takes the form as follows:

<rule-op> [<affix>] [<context>]

where everything is as defined in the SUFFIX rule except that the context and affix components are reversed, as is the pound sign that indicates the end of the word.

An example of a prefix orthographic rule is found in the German language description in APPENDIX II:

```
! ensure that participle has no more than one unstressed prefix and
! that weak verbs ending in -ieren do take ge- prefix, eg,
! bestellen → bestellt and studieren → studiert
    PREFIX (NO_GE) + ["GE"] [char] → [char]
```

The left-hand side of the rule comprises the rule operator (+), the prefix ["GE"] and the context [char]. In the context, char is a variable name used to specify a set of characters, or character strings, that would serve as possible contexts for the orthographic rule. The variable (char) would be declared in a separate declaration and associated with a set of range values. The rule states that if the prefix "GE" is to be added to a word beginning with any letter and the word has a positive value for the NO_GE feature, then the GE is dropped. If this orthographic rule applied to every form rule, then the GE prefix would never be applied. Notice that this orthographic rule only applies to certain words, as limited by the use of the parameter NO_GE. The present invention provides that application of the spelling rules may be controlled by orthographic parameter features associated with lemma entries in the lexicon 22. Where the lexicon entry contains information showing that the parameter of the orthographic rule applies, only then will the spelling rule apply. For example, a lexicon entry for the German word studieren might contain the following information:

```
citation: studieren
paradigm: verb_weak
stems: inf = studieren
orth_features: NO_GE = yes
```

The orth_features entry contains the parameter NO_GE and an indicator stating that the orthographic rule should apply in forming inflections of studieren.

The description of the M language 12 syntax above outlines the general declarative features of the language. In declaring the set of rules according to the constructs above, an exemplary embodiment of the present invention provides for the following additional syntax requirements. A rule set must include a rule name, a set of declared features with their respective range of values, and a set of paradigms. The rule set may optionally contain a set of orthographic rules and accompanying sets of variables and sets of values over which the variables may range. Additionally, the declaration of a rule set must be arranged in the following order, the rule set name, the feature values, sets (used for orthographic rules) variables, (used for orthographic rules) orthographic rules and paradigms. In declaring paradigms, a parent paradigm must be declared before its children.

THE LEXICON

In addition to the user prepared declarative rule set 16 to describe a natural language, the user 14 must also specify a lexicon 22. In an exemplary embodiment of the present invention, the lexicon 22 is a database of word entries that are each associated with some paradigm in the user specified rule set 16. In an exemplary embodiment, the information retrieval program AI-STARS manufactured by Digital Equipment Corporation can be used to create the database entries. The word entries in the lexicon 22 contain identifiers following the syntax of the M language 12. The syntax of the M language 12 provides a connection to associate the appropriate information stored in the lexicon 22 entries with appropriate form rules. For example, in APPENDIX III the user prepared declarative rules 16 (FIG. 1) for the French language list some typical lexical entries:

```
citation: sentir
paradigm: verb_re_ir
stems: inf = sentir, PRÉS_SUB = sen
features:
citation: pouvoir
paradigm: verb_re_ir
stems:    inf = pouvoir, BASE = peu, prés_1s = peux,
          prés_1s = puis, prés_2s = peux, prés_3p = pouvent,
          PRÉS_P = pouv, PAS = pu, PAS_P = pu,
          PRÉS_SUB = pui, sub_prés_1p = puissions,
          prés_2p = puissiez, FUT = pourr
features:
```

A citation form (indicated by the "citation" by word) is used to identify the lemma. This string (e.g., sentir or pouvoir) should correspond to the form of a word one would use to look up a word in a regular dictionary. A citation form need not be unique. A noun and a verb may well share the same citation form. The name of the paradigm which describes the morphological behavior of the lemma is also provided in each lexicon to link the lexicon citation to the appropriate form generating rules. The user can specify in some cases one or more stem forms, to be used as starting points to derive the various inflected forms. For example, a regular verb (such as sentir above) might only require the infinitive stem to be specified in the lexicon 22, whereas a highly irregular verb (such as pouvoir above) may require stems for a number of forms. The English verb "run," for example, might require both the present stem "run" and the past stem "ran" to be stored in the lexical entry. Each stem stored in the lexicon 22 must be associated with the name of a corresponding form in its paradigm. Thus, for each stem, the present invention provides that a form name (the LHS of a form rule) must be provided in the lexicon 22. In this way, the present invention can map lexical stems to their proper use in the paradigm.

In addition, the present invention provides that features and values which are sometimes required by the user declared paradigms can be specified in the lexicon 22. Lexical override, discussed above, is one such feature where information in the lexicon 22 (other than the paradigm name, form name, and stem) is necessary to constrain morphological processing.

Parameters are another type of feature, pertaining to the application of an orthographic rule, that can be specified in a lexical entry. For example, the lexicon entry for the German word studieren, described above, contains the parameter (NO-GE) corresponding to an orthographic rule parameter, thereby indicating that the orthographic rule should apply in forming inflections of studieren. When a parameter is declared in an orthographic rule, a lexical entry for a word must contain a corresponding parameter value in order for the spelling rule to apply. Using this feature, the user is able to easily control the application of the orthographic rule to only the appropriate words.

Optionally, a lexical item may contain other kinds of information. For example, a lexicon entry can contain features and values which are independent of the paradigm. For example, if the gender of a French noun is not altered or determined in a paradigm (via affixation), then the gender of the noun may be indicated via a feature/value pair stored directly in the lexicon, as for example: "chapeu" gender= masc. Additionally, a lexical entry may contain pointers to word senses. A lemma may have one or more word senses, which are stored in the lexicon 22 as independent objects, and other syntactic information, such as subcategorization classes.

Referring again to FIG. 1, the user 14 inputs both a set of prepared declarative rules 16 according to the syntax of the M language 12 and a set of lexicon entries 22 as described above. This input is stored in the secondary storage location 10 until the compilation phase processing begins.

RULE SET COMPILATION a. Overview

In a compilation phase, the processor uses the executable statements and data structures comprising the compiler module 18 to read the set of user prepared declarative rules 16 and create the rule information data structure 20, which can be used in all phases of morphological processing, and two other data structures, (a discrimination net 21 and of non-netted set) which are created for use in morphological recognition and the discrimination net 21—both of which are used in the run-time phase. FIGS. 2A–2I depict exemplary process flows for the various steps of compiling the user prepared set of declarative rules 16, such as those for the German language in APPENDIX II or those for the French language in APPENDIX III. The FIGS. 2A–2I depict the flow of control that the processor 6 follows in using the compiler module 18 to create a computer-manipulatable data structure to perform morphological processing. Additionally, a high-level description of the compilation process is presented in the exemplary algorithm listed in APPENDIX IV.

Figures 1, 2A:
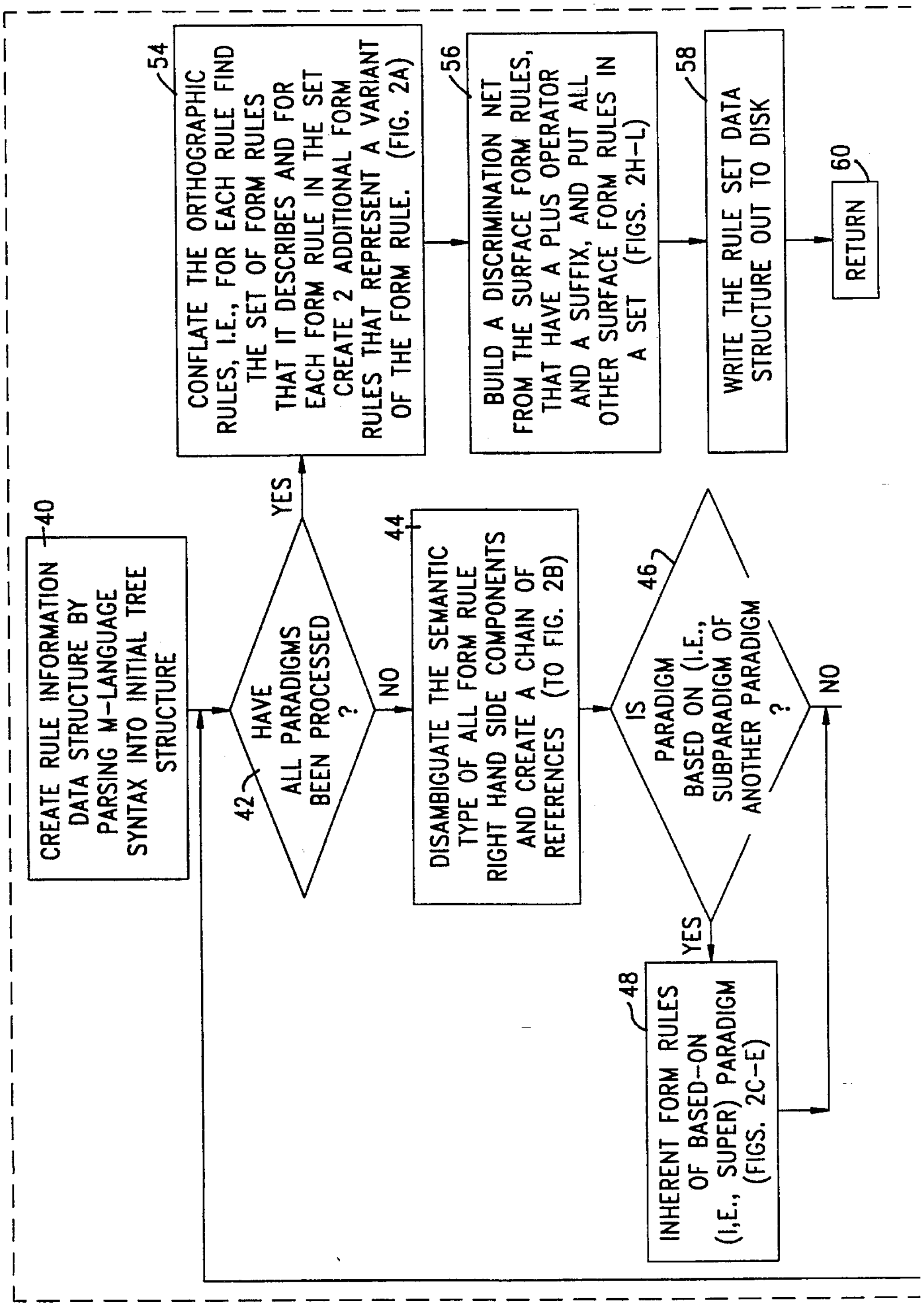
FIG. 2A Depicts an overview of an exemplary process flow for the compiler module of the present invention.

When the compiler module 18 (FIG. 1) is invoked by a user command, the processor 6 retrieves the set of user prepared declarative rules and processes them according to the statements in the compiler module 18. FIG. 2A depicts an exemplary process flow for rule-set compilation and provides an overview of the entire compilation process, the flow of control dictated by the statements of the compiler module 18. In step 40, the processor 6 uses the statements of the compiler module 18 to create the rule information data structure 20, initially comprising a parse tree. A parse tree is a representation of data contained in the user prepared declarative rule set 16 that is hierarchically organized in the form of a tree. The root of the tree represents the top of the hierarchy and the elements of the user prepared declarative rules 16 are represented as nodes of the tree in levels. In the level first from the root, the primary elements of the user prepared declarative rules 16 are grouped into categories identified by the nodes: feature values, sets, set variables, orthographic rules and paradigms. Below each categorization node, there is a node for each declared element (e.g., a node for each of the declared paradigms). In the level below each declared element, there is a node corresponding to each of the components of the element. For paradigms, there would be nodes, for example, identifying surface form rules and intermediate form rules. Attached at the lowest nodes are leaf nodes containing the most specific data. For example, under each form rule node is a leaf node containing the value of the form operator (i.e., + or –). The tree, during the compilation process, evolves into the rule information data structure 20 by the operations described below.

With the user prepared declarative rules 16 parsed in step 40, the processor 6, in step 42, begins a loop to further process each declared paradigm identified in the rule information data structure 20. In step 44, the semantic type of each component in the right-hand-side (RHS) of every form rule is "disambiguated" and if possible "chained" by a procedure that is described in detail below in FIG. 2B. As mentioned above, a form rule comprises a left-hand-side identifier of the form (the form name) and a set of right-hand-side construction components, i.e., a stem and, optionally, an affix and, if the affix is present, an operator. The right-hand-side stem can be an identifier, i.e., the left-hand-side (LHS) name of another form rule or a form set, and the RHS affix can be an identifier of an affix_var. This is illustrated by the chain of references from (prés_1s) to (BASE) to (inf) to (LEX) in:

```
Intermediate_forms {
    BASE: inf – "ir"
    . . .
            }
            Surface_forms{
                inf: LEX
                prés_1s: BASE + "E"
            }
```

Disambiguation is the process of taking the identifiers of other form rules or form sets or affix_vars and creating actual references or links to the appropriate data structures. The disambiguation process creates a chain of references between form rules, representing the steps of its construction. The chain must terminate with a lexical form reference "LEX" to a character string in the lexicon. Disambiguation replaces the form names with links to the actual form data structures that represent the different form rules. It is described in detail below with the discussion pertaining to FIG. 2B.

Referring again to FIG. 2A, after the form rules have been "disambiguated" (in step 44) the paradigm processing loop (step 42) continues in steps 46 and 48 to process any "based-on" references for form rule inheritance. In addition to form chaining, the present invention presents a method and apparatus for paradigm inheritance, in which one paradigm (a sub-paradigm) inherits the form rules contained in other paradigms (super-paradigm). In step 46, the processor determines whether the currently examined paradigm is "based-on" another paradigm by searching for a (based-on) declaration in a leaf node of the rule information data structure 20 tree branch of that particular paradigm. If, in step 46, a (based-on) declaration is found, then in step 48, a form inheritance procedure is invoked. The inheritance procedure, which is explained in detail below with reference to FIGS. 2C–2E, creates references to the appropriate data structures that will allow the current paradigm (sub-paradigm) to "share" the form rules of its super-paradigm. Upon completion of the form rule inheritance process, each "shared" form rule node in the parse tree 41 contains a list of all the paradigms that share it.

Referring again to FIG. 2A, the paradigm processing loop (begun in step 42) continues after the form rule inheritance check (steps 46 and 48) with the expansion or "conflation" in step 50 of any form set that is referenced by any form rule. In step 50, form set conflation comprises the process of expanding or filling out the compact descriptions of the user declared form rules 16 by replacing each form rule that contains a RHS reference to a form set with a set of form rules, one form rule for each member of the form set. For example, the user 14 might declare the following form set, intermediate form rules and surface form rules in a paradigm:

```
form sets {
    DEGREE = (POS, COM, SUP)
}
intermediate forms {
    BASE: LEX
    POS: BASE
    COM: BASE + "er"
    SUP: BASE + "est"
}
surface forms {
    nom_msing: DEGREE + "er"
    gen-msing: DEGREE + "es"
    dat_msing: DEGREE + "em"
}
```

The form set DEGREE is referenced in each of the three surface form rules: nom_msing, gen_msing and dat_msing. The form set DEGREE includes references to three intermediate form rules POS, COM and SUP. The form set conflation process replaces the three surface form rules that reference the form set DEGREE with the following set of surface form rules:

```
surface_forms {
    nom_msing.POS:          POS + "er"
    nom_msing.COM:          COM + "er"
```

-continued

| | |
|---|---|
| nom_msing.SUP: | SUP + "er" |
| gen_msing.POS: | POS + "es" |
| gen_msing.COM: | COM + "es" |
| gen_msing.SUP: | SUP + "es" |
| dat_msing.POS: | POS + "em" |
| dat_msing.COM: | COM + "em" |
| dat_msing.SUP: | SUP + "em" |

For each surface form previously listed there are now three surface forms—each corresponding to one of the references in the form sets. Each surface form is uniquely identified on the left-hand-side (LHS) by using the prior form name concatenated with a.<form_name> identifier.

Referring again to FIG. 2A, after the form set conflation procedure of step 50, the paradigm processing loop (begun in step 42) continues in step 52 with the final step of checking all form rules of a paradigm for cycles. The cycle detection step comprises a process of taking each form rule and following the chain of form rule references to make sure there are no repeating references to a form rule. As each form rule must eventually chain back to a LEX reference to a string in the lexicon, a repeated reference to a form construction rule in the chain indicates that the form rule will cycle and not map back to a string form. For example, the following declarations would be an incorrect declaration for verbs in the French language:

```
Intermediate forms {
    Inf: BASE–"ir"
Surface_forms {
    BASE: prés_1p + "ir"
    prés_1p: Inf + e
```

This example provides the following nonsensical chain of (prés_1p) to (inf) to (BASE) to (prés_1p) and is an illegal declaration according to the exemplary syntax of the M language 12. In step 52, the process is to begin with the surface form rules for each paradigm and chain back through the form references, checking for repeated references.

During the cycle checking process in step 52, the present invention also provides a method and apparatus for propagating the morpho-syntactic features of each word form through the intermediate forms up to the surface forms. When a surface form is constructed by a succession of form rules, it would be possible to simply associate all the grammatical features of the result with the surface form itself. However, it is sometimes the case that the intermediate stems can be associated with some subset of the final set of features. For example, in German, a user might construct imperfect tense surface forms in two steps, first constructing an imperfect stem, then appending suffixes to it to indicate person and number:

| | |
|---|---|
| IMP:BASE | [tense = imperfect] |
| IMP_1S:IMP + "te" | [person = 1, number = singular] |
| IMP_2S:IMP + "test" | [person = 1, number = singular] |
| IMP_3S:IMP + "te" | [person = 1, number = singular] |

The task is to indicate that the surface forms IMP_1S, IMP_2S, and IMP_3S also carry the imperfect tense as a feature value. The present invention provides a default mechanism to pass feature values from included stems to resulting forms. Any form constructed using the append operator (+) will, by default, also include the features of its stem form rule without the user having to explicitly include those features in the list of features associated with the resulting form. This process is called "feature propagation", because features from intermediate forms are propagated to any forms which utilize them in their construction. Feature propagation is essentially a notational convenience, obviating the need to specify certain features many times in resulting forms when they can be specified once in an intermediate form and propagated automatically to the resulting forms. It also reflects well, from a linguistic standpoint, how the grammatical interpretation of a surface form is built up from its parts. Feature propagation does not occur across construction rules using the removal (–) operator. Typically, the removal operator is employed to create new base strings by removing affixes. Hence, it would be unusual to desire features to propagate across such operations.

Referring again to FIG. 2A, the processor 6 begins a process for cycle checking and feature propagation as follows. In step 52, the processor 6 searches for surface form rule nodes in the rule information data structure 20 to determine if all the form rules for a given paradigm have been processed. If so, the processor 6 proceeds to a get next paradigm step 59, and the flow of the process continues to step 42, to begin processing another paradigm. If in step 52, all the form rules for a given paradigm have not yet been checked, then the processor 6, in step 57, will get another form rule from the tree that is evolving into the rule information data structure 20 through the compilation process. Then, in step 58, the processor 6 will call a cycle check/feature propagation procedure to determine if the chain of form rule references is free of cycles and to propagate features (for form rules with a +operator) in a procedure described in detail below with reference to FIG. 2F. If the procedure invoked in step 58 encounters a cycle, for the form rule in question, the processor 6 generates an error in step 60 and then returns to step 52 to process another form rule until all form rules for a paradigm are processed.

Figures 2, 2A:
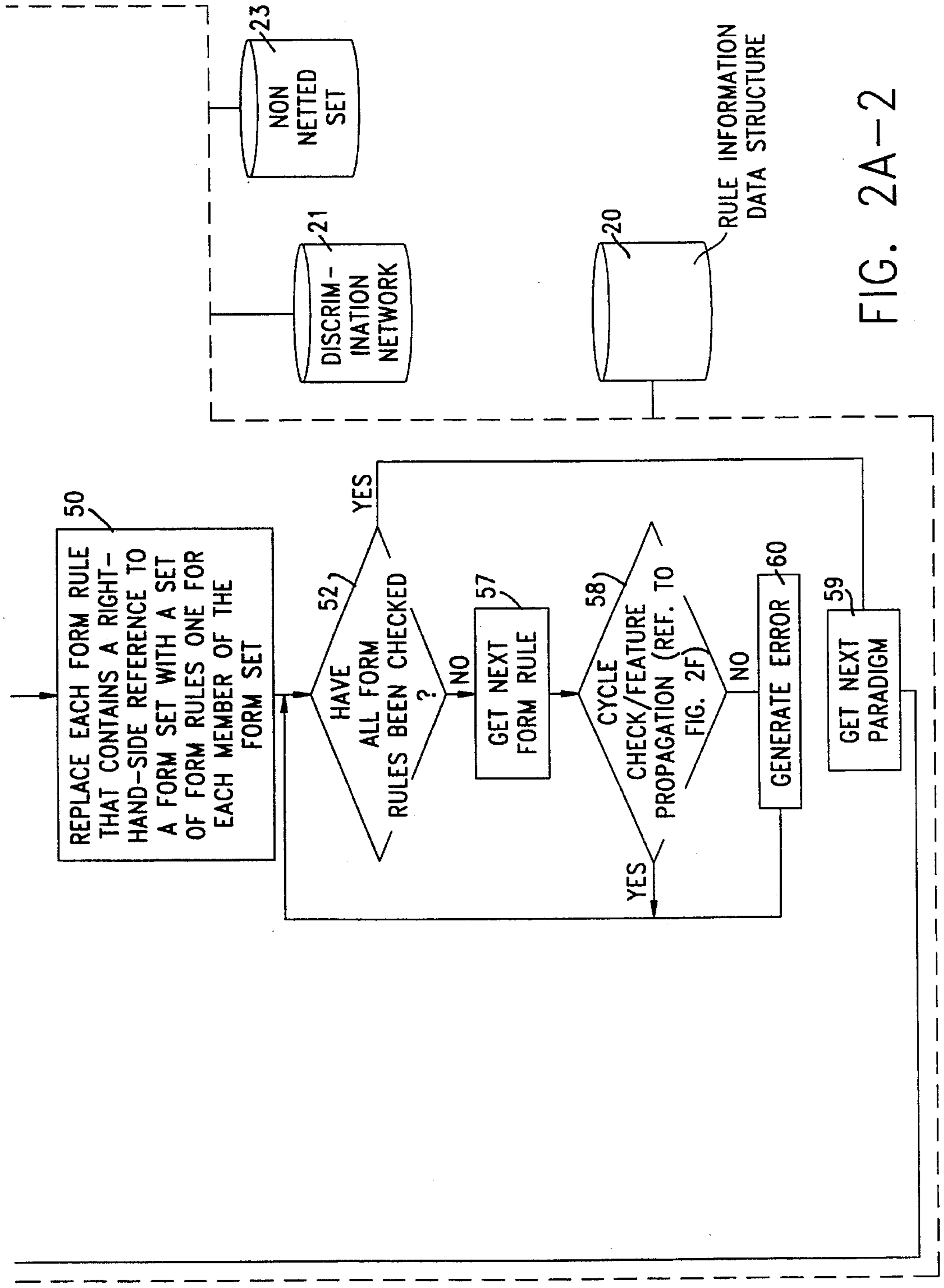

After the cycle check and feature propagation procedures described in steps 52–60 in FIG. 2, compilation processing is complete for a given paradigm. The processor 6 then returns to step 42 to determine if there are other paradigms to process, and if so, the processor will execute steps 44–60 described above.

When, in step 42, the processor 6 finds that all paradigm form rule processing is complete, the processor 6 will then proceed in step 54 to "conflate" the orthographic rules with the form rules. A feature of the present invention is the fact that orthographic rules are described separately from the grammatical paradigms. The compiler plays a special role in permitting the user to freely declare orthographic rules apart from grammatical construction paradigms in that it automatically compares each orthographic rule with each form rule to determine to which form rules each orthographic rule might apply. To make this determination, the processor, in step 54, will compare the affix and operator in the left-hand-side of the orthographic rule with the operator and affix in the right-hand-side of the form rule. Each orthographic rule is compilated with the set of form rules to which the orthographic rule could apply. Once the processor 6 determines in step 54 that an orthographic rule applies to a particular form rule, the processor 6 conflates the form rule, in a process that will be described in detail below in FIG. 2G, creating an inner variant form rule and an outer variant form rule of the same type as that of the matching form rule to map the correct spelling of the word to the grammatical construction in a process as described below. If the orthographic rule contains a parameter, that parameter is associated with the newly created outer variant form rule.

After the processor 6 performs the steps of orthographic rule conflation in step 54, the process of compilation is completed, in step 56, by building a discrimination net 21, using the surface form rules in the rule information data structure 20. A discrimination net 21 is a standard data structure used in artificial intelligence programming and is commonly used by systems for morphological recognition. The present invention creates a discrimination net 21 to index the final suffixes of those surface form construction rules with a plus (+) operator in the right-hand-side, and additionally stores together references to those surface form rules having a minus (–) operator on the right-hand-side or a prefix in a non-netted table 23. Additionally, the processor 6, in step 56, provides references in the net to the corresponding surface forms and shared paradigms. The process of building the discrimination net, in step 56, is described more fully below with reference to FIGS. 2H–L.

Once the discrimination net is complete, the processor 6, in step 56, stores that net along with the rest of the compiled rule set data structure 20 (FIG. 1), which is then stored in the secondary storage area 10 (FIG. 1). Compilation phase processing is now complete, and the processor 6 will commence a run-time phase upon user command. However, the processes of disambiguation and chaining, form inheritance, cycle checking, orthographic conflation and discrimination network building are described in detail below.

a. Right Hand Side Disambiguation and Chaining of Form Rules

Figure 2B:
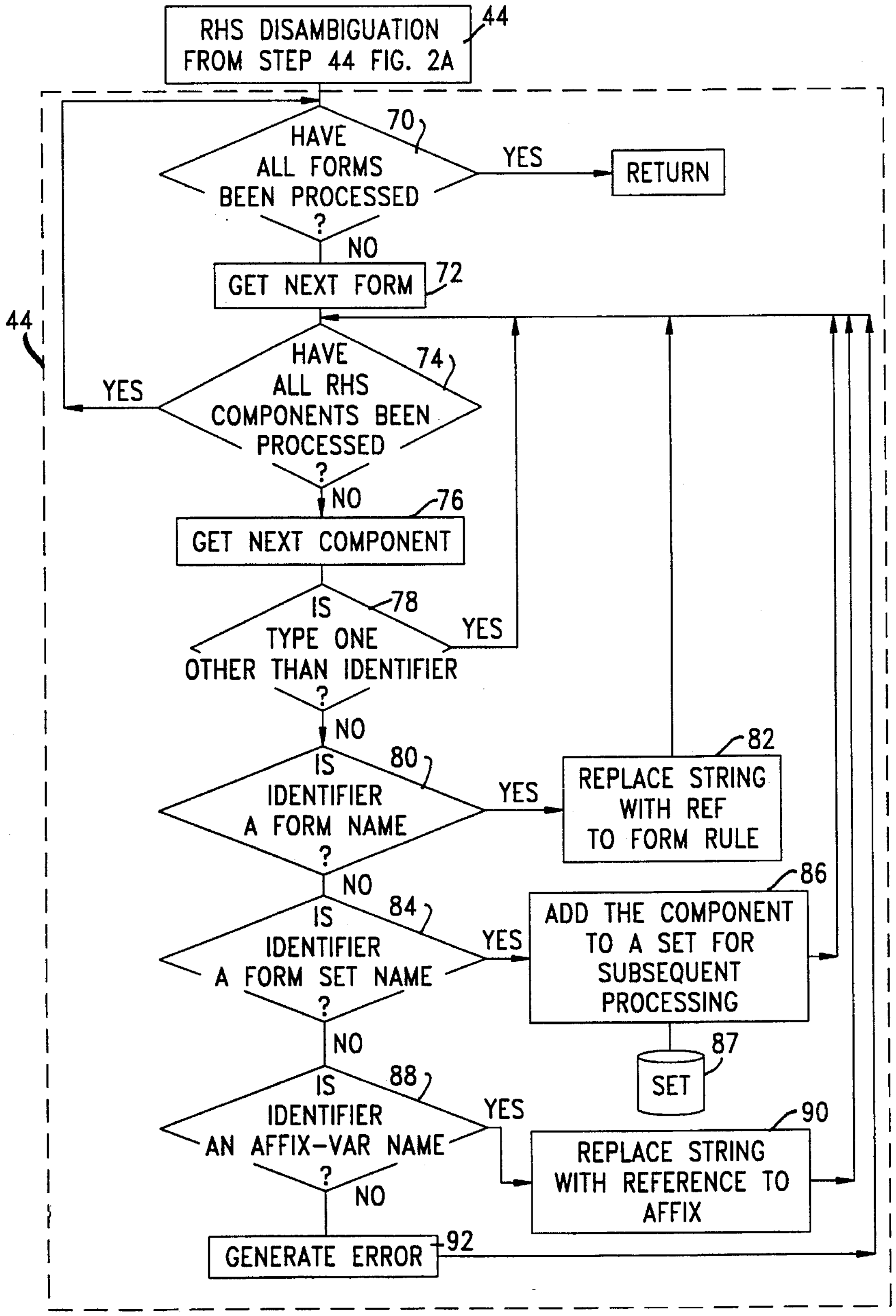
FIG. 2B Depicts an exemplary process flow for the right-hand-side "disambiguation" and chaining functions of the compiler module of the present invention.

In FIG. 2A, step 44, the processor invokes a procedure to "disambiguate" the right-hand-side of each form rule in a paradigm. FIG. 2B depicts exemplary process flow for the right-hand-side RHS form rule disambiguation and chaining process of step 44 in FIG. 2A. The process of disambiguation is to take each component of the RHS of a form rule, and if that component has as its value an identifier, find the corresponding structure (i.e., form rule, form set or affix_var). In the case of a form or affix_var name, the processor 6 will replace the name with a reference to the actual form or affix_var data structure. In the case of a form set name, a reference to form rule stem is stored for subsequent form set conflation. Referring to FIG. 2B, the processor 6 begins a loop to process the form rules of each paradigm on a paradigm by paradigm basis. In step 70, processor 6 checks whether all form rules for a given paradigm in the processing loop of FIG. 2A have been processed. Referring to FIG. 2B, if in step 70, there is an unprocessed form rule, the processor 6, in step 72, will retrieve the form rule from the corresponding node in the rule information data structure 20. In step 74, the processor 6 begins a loop to process each right-hand-side component of the form rule. If there is a component, not yet processed, the processor 6, in step 76, will get the next component. In step 78, the processor 6 determines whether or not the RHS component is an identifier to be disambiguated. If the component is not an identifier (i.e., it is either a literal string, the special token NIL (meaning the form rule does not exist in the paradigm) or the special token LEX (meaning that the form is stored in the lexicon 22), the processor 6 will stop processing that current RHS component and return to step 74 to process another right-hand-side component if there is one.

Referring again to step 78, if the current component is an identifier, the processor 6, proceeds to step 80 and makes a determination of whether the identifier is a form name.

As described above, a form name is the left-hand-side identifier of any form rule (e.g., "prés_1s"). If so, the processor 6, in step 82, will replace the string of characters representing the form name found in the form rule node of the rule information data structure 20 (FIG. 1) with a reference to the actual form rule. To find that form rule in step 82, the processor 6 will search the set of form rules of the current paradigm, and if it is not found, then proceeds to search hierarchically "ancestor" paradigms of the current paradigm. An ancestor paradigm is the immediate super-paradigm of the current paradigm (as determined by the based-on statement) or an "ancestor" paradigm of that super-paradigm. Once the string identifier in the component is replaced in step 82 with an actual reference, the processor 6 will return to step 74 to process another RHS component.

Referring again to step 80, if the identifier component is not a form rule name, the processor 6, in step 84, will next determine whether the identifier is a form set name. As described above, a form set can be used as the RHS stem to identify a group of form rules to which represent a similar type of form construction. If, in step 84, the identifier is a form set name, the processor 6, in step 86, will place a reference to the component (i.e., form rule stem) in a special node of the rule information data structure 20 (FIG. 1) for subsequent processing. The form rule containing that form set identifier will be replaced later in step 50 (FIG. 2A) with a set of form rules, one for each member of the form set. Next, the processor 6, after completing step 86, proceeds to the beginning of the component processing loop, step 74, to process any remaining RHS components of the current form rule.

Referring again to step 84, if the identifier is not a form set name, the processor 6, in step 88, will determine whether or not the identifier is an affix variable name. As described above, affix variables provide a set of possible affix strings that could be applied in a particular form rule construction. If in step 88 the variable is an affix variable name, the processor 6 will replace, in step 90, the string in the form rule node with a reference to the actual location in the rule information data structure 20 corresponding to the affix variable set. After step 90, the processor 6 returns to the beginning of the component processing loop (step 74).

If in step 88 the processor 6 determines that the component is not an affix variable identifier, in step 92 the processor will generate an error, because the component is not one of the legal forms as either a string, NIL or LEX entry, form rule identifier, form set identifier, an affix variable identifier.

Referring to step 74, if the processing of all forms is complete, the processor 6 will return to the beginning of the form rule processing loop (step 70) to process the RHS components of the form rules as described above. When each form rule has been processed, the processor 6, returns to step 44 in FIG. 2A.

b. Form Rule Inheritance (With Cycle Checking).

Referring again to FIG. 2A, in step 48, the processor 6 performs the paradigm inheritance procedure. FIGS. 2C–2F depict exemplary process flows for the form rule inheritance procedure. Form rule inheritance, as described, permits the form rules of the present invention to be re-used by different paradigms. Where the processor 6 encounters the "based-on" declaration in a paradigm, the processor 6 will perform the process as follows.

Figure 2C:
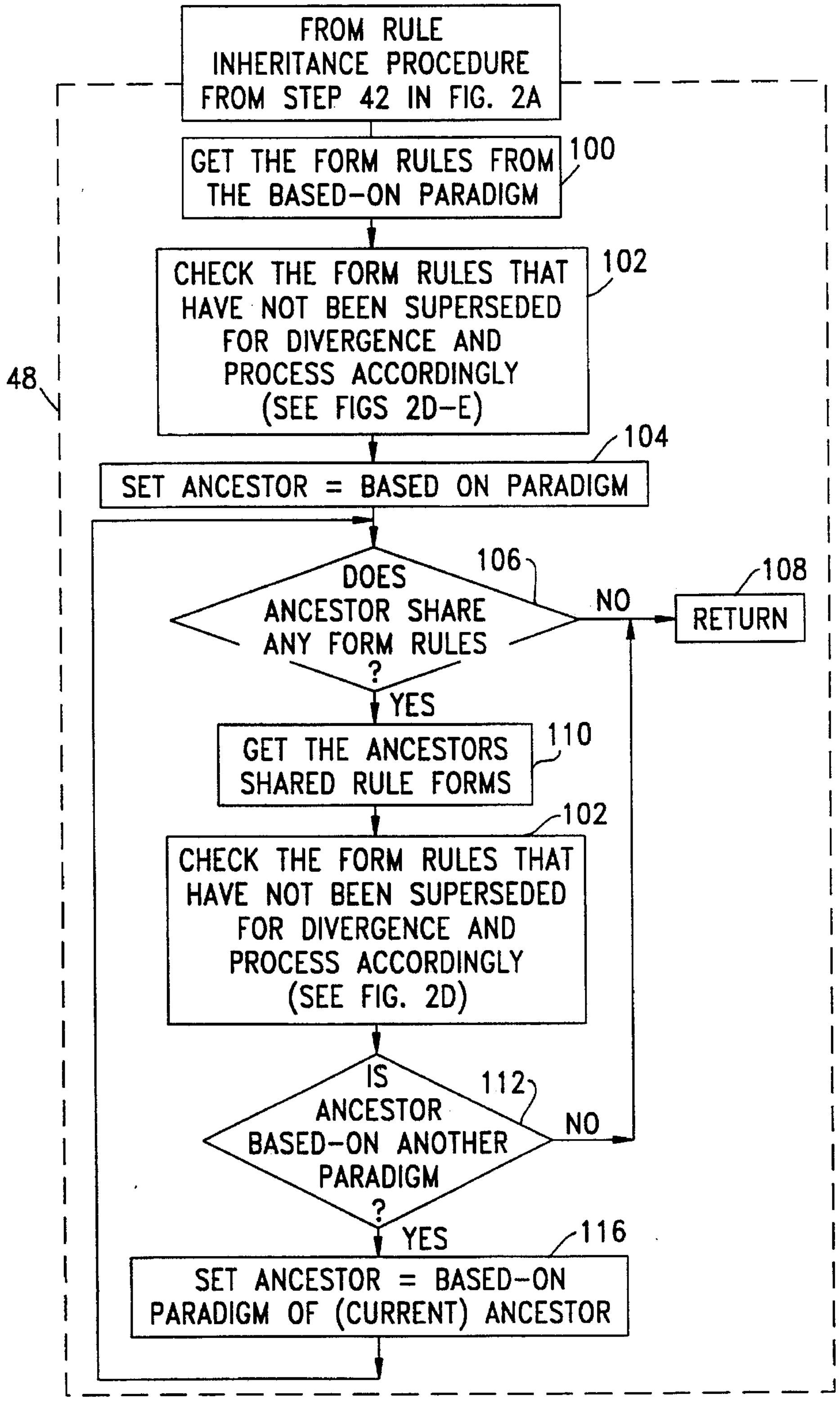
FIG. 2C Depicts an exemplary process flow for a form rule inheritance feature of the compiler module of the present invention.

In step 46, (FIG. 2A) the processor 6 will search the current paradigm branch of the rule information data structure 20 (FIG. 1) to locate a based on declaration. If one is found, the processor 6 will pass control to the process flow as depicted in FIG. 2C, to step 100, and will retrieve the form rules from the super-paradigm, beginning in step 102, to process those form rules that have not been "superseded" by the sub-paradigm. A form rule is superseded when a form rule with an identical LHS appears as a form rule in the sub-paradigm. The process for form rule screening and divergence checking is described below with reference to FIG. 2D. If the form rule has not been superseded, then it is checked for divergence. A divergence check takes the form rule to be inherited and goes back through the chain of stem form rule references to see whether any intermediate form rules in the chain have been superseded in the current paradigm. If so, then an additional branch (a reference to the divergent form rule) must be added to the reference chain in the inherited form rule. Both the form rule screening process and divergence check are described in detail below with reference to FIGS. 2D and 2E.

Referring again to step 102 in FIG. 2C, once the screening out of superseding form rules and divergence check of inherited form rules is complete, the process, in step 102, will yield a set of form rules from the super-paradigm that will be "inherited" or "shared" by the sub-paradigm. Each of the inherited form rules of the super-paradigm will contain a "shared by" reference to the sub-paradigm. Those form rules may also contain "divergent path" references as appropriate, as will be described below. Further, a reference to each inherited form rule is stored in the subparadigm as an optimization during the morphological generation function at run-time.

In step 104, the processor 6 will then set an "ancestor" variable to be equal to the super-paradigm of current paradigm, and the processor 6 will investigate whether the super-paradigm "shares" any form rules with a paradigm super to it. In step 106, the processor 6 determines whether the ancestor paradigm shares any form rules by looking for the set of shared form rules in the rule information data structure 20. If, in step 106, the ancestor is not based on another, the processor 6, in step 108, will terminate the procedure and return to the step where the form rule inheritance procedure was called (e.g., step 48 in FIG. 2A). Otherwise, in step 110, the processor 6 will retrieve the ancestor's set of shared form rules and, in step 102, screen out superseded form rules and perform the divergence check on the inherited form rules mentioned above, and described in detail below.

In step 112, the processor 6 continues to check the chain of paradigm inheritance, by determining if the ancestor paradigm has its own ancestor. Again, this is performed by checking for the occurrence of a based-on statement in the ancestor paradigm and retrieving that paradigm reference. If the ancestor is based on another, in step 116 the processor 6 sets the ancestor marker to equal the reference in the based-on declaration and returns to step 106 to perform the form rule screen and divergence check for any form rules shared by the ancestor. If, in step 112, the ancestor paradigm is not based on another, the processing will terminate and the processor will return to step 48 in FIG. 2A.

c. Form Rule Inheritance Processing—Form Rule Screening and Divergence Check

Figure 2D:
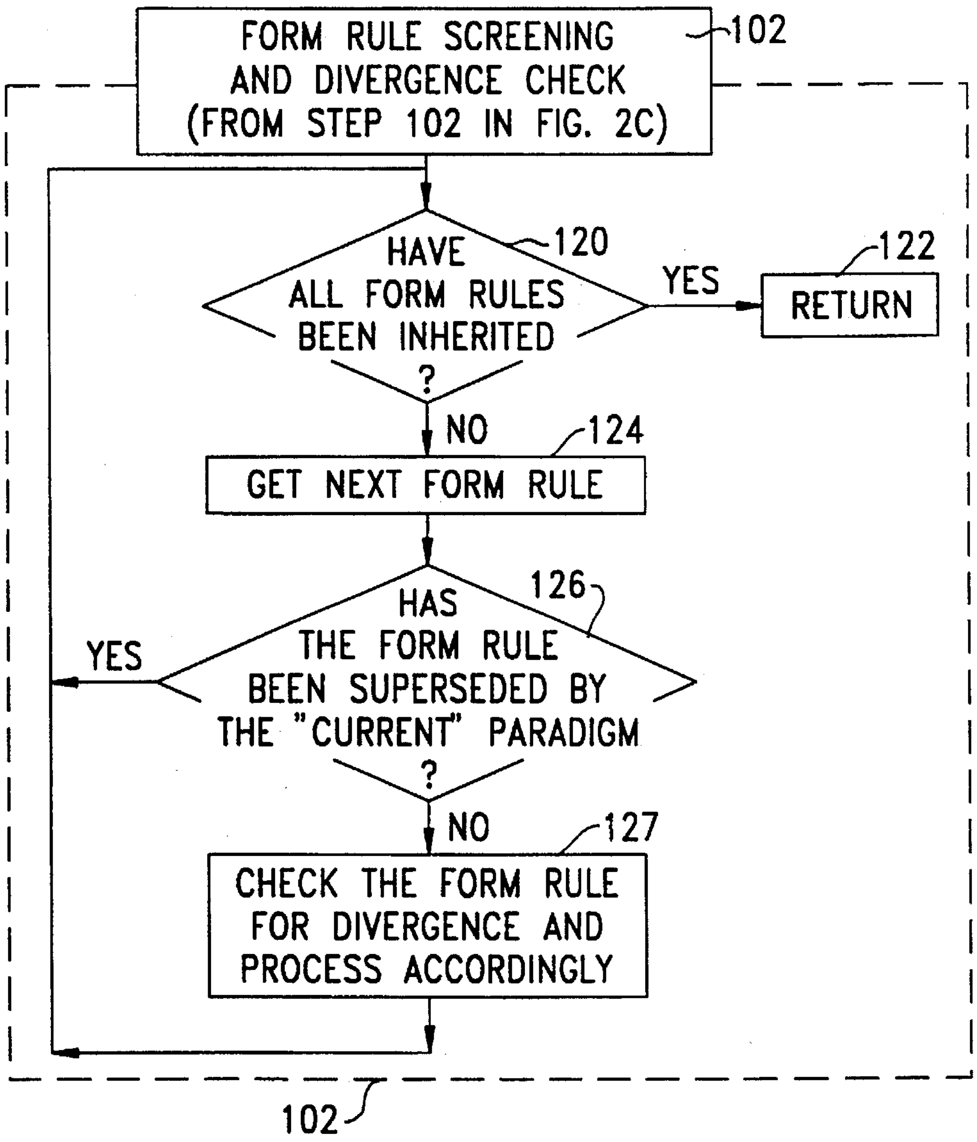
FIG. 2D Depicts an exemplary process flow for a form rule inheritance processing feature of the compiler module of the present invention.

In step 102 of FIG. 2C, the processor 6 invokes a process to screen out those form rules that have been superseded and further check the rules that have not been superseded for path divergence. That process is now described with reference to FIGS. 2D–E. In FIG. 2D. The processor 6 begins with the set of form rules declared in the super-paradigm and it begins, in step 120, a loop to screen out those form rules that are: 1) superseded by the "current" (sub) paradigm, and 2) check the form rules to be inherited for divergent paths.

If, in step 120, there are unchecked form rules, the processor 6 proceeds in step 124 to get a form rule. In step 126, the processor 6 checks the form rule against the form rules in the current paradigm to determine whether or not it has been superseded. Again, a form rule is superseded when a form rule with an identical left-hand-side is declared in the current paradigm. If the form rule has been superseded, the processor 6 in step 126 disregards the form (as it will not be shared) and proceeds, in step 120, to the beginning of the loop to process another form rule from the set processed of form rule of the super paradigm. And if all the form rules have been processed, the processor 6 will return to step 102 in FIG. 2C.

Figures 1, 2E:
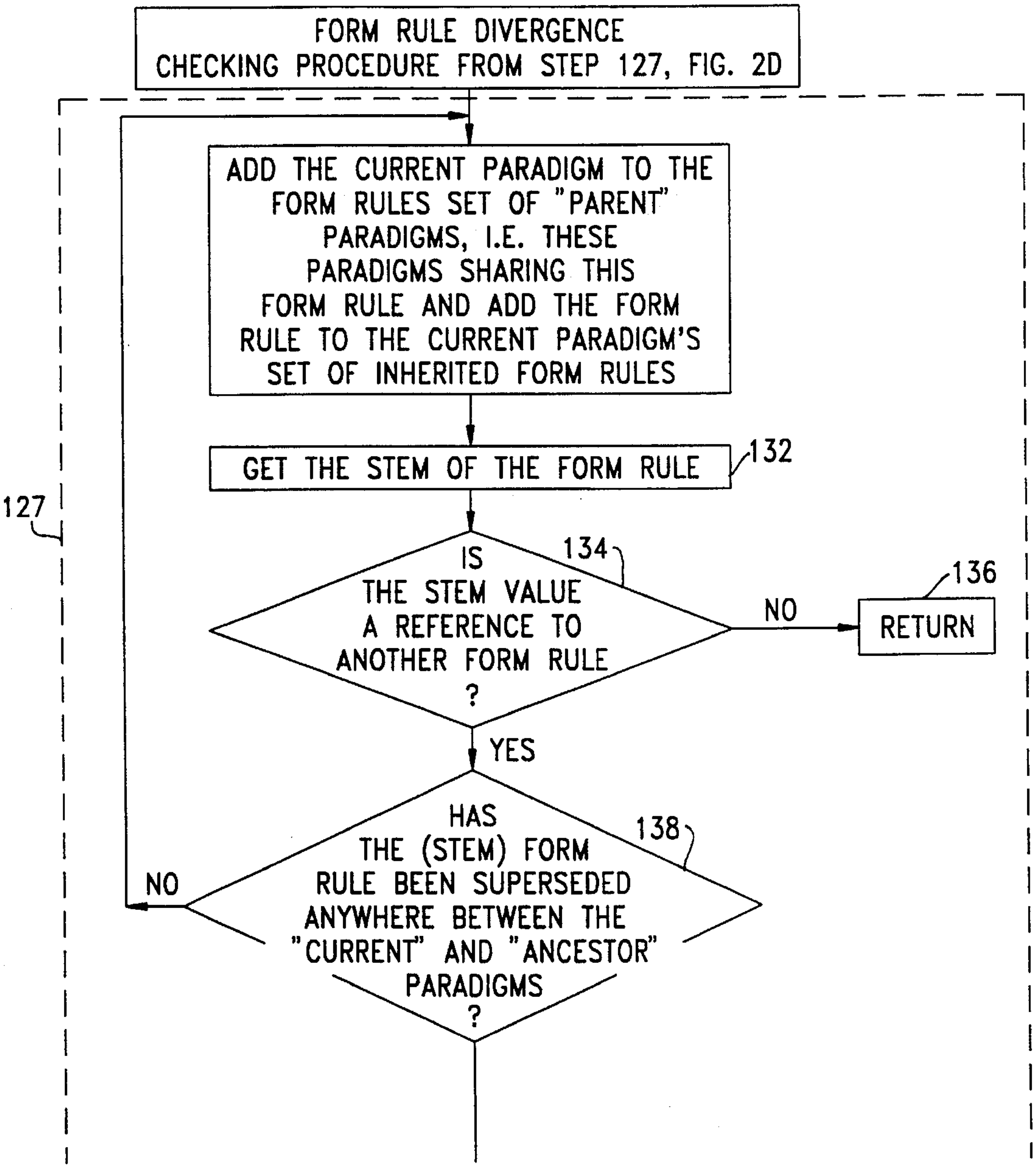
FIG. 2E Depicts an exemplary process flow for a form rule divergence check feature of the compiler module of the present invention.
Figures 2, 2E:
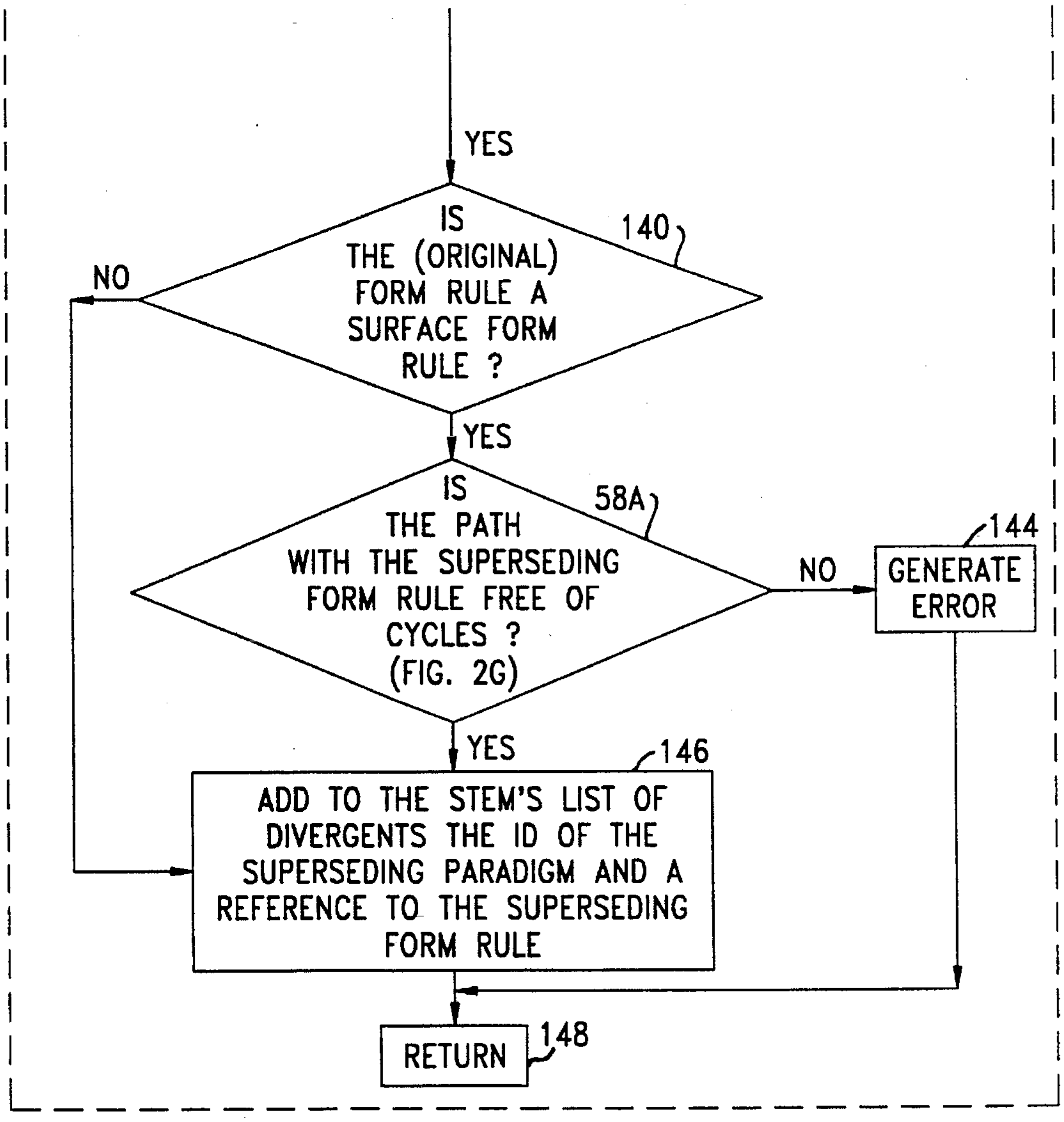

Referring again to step 126 in FIG. 2D, if the form rule currently being examined has not been superseded, the processor 6 will, in step 127, invoke a procedure to perform a divergence check on the form rule. FIG. 2E depicts an exemplary process flow for the divergence check process of step 127.

When a form rule is inherited, the super-paradigm form rule is "shared" by the sub-paradigms that inherit the rule. This is accomplished by: 1) associating with each shared form rule a list of the paradigms that share it; and 2) placing a reference to the shared form rule in each of the subparadigms that have inherited it. (The latter is an optimization for the function of morphological generation). Associated with a super-paradigm form rule that is inherited by a number of sub-paradigms, might be the following informat ion:

| | |
|---|---|
| Affix Type: | SUFFIX |
| Operator: | + |
| Affix: | "e" |
| Stem: | BASE2 |
| Shared by: | 1,3,4 |

where the references "shared by" are identifiers of the paradigms that share the super-paradigm:prés_1s. Referring again to FIG. 2E, in step 130, the processor 6 adds the current paradigm to the list of sharing paradigms of the current form rule of the super-paradigm.

Next in step 132, of FIG. 2E, the processor 6 retrieves the stem of the ancestor form rule, and, in step 134, determines whether the stem value is a reference to another form rule. If not, no further divergence checking needs to be performed, and the processor 6 will return to where the divergence check was invoked (i.e., step 127 in FIG. 2D).

Referring again to step 134, if the stem is a reference to another form rule, the processor 6 proceeds to step 138 to determine if that stem form rule has been superseded anywhere between the original paradigm that is inheriting form rules, and the current ancestor. This determination is made by searching the original paradigm, and each one of its ancestors back to the current ancestor, for a form rule with an identical left-hand-side. If the form rule was not found in step 138 then there is no divergence. The processor 6 then returns to step 130 to continue following the chain of form rules, processing the stem of that stem of the form rule.

If a superseding form rule was found in step 138 then the processor 6 proceeds to step 140 begin a cycle check procedure on the original form rule to determine if it is a surface form rule.

As stated above, a cycle check is a procedure to check the reference chain of the form rule, searching the form rules referenced in the right-hand-side of the form rule, until a LEX identifier is found. In the present invention, a form rule cycle check could be performed at one of two different times.

Referring to FIG. 2A, in step 58, the processor 6 invokes the cycle check on the set of surface form rules declared in the "current paradigm". If the current paradigm is based on another paradigm, then this set of surface form rules represents those (surface) form rules that are superseding those with the same left-hand-side in the super-paradigm. Also, if the current paradigm is based on another paradigm, then prior to step this paradigm, in step 48, (FIG. 2A) will have inherited form rules from its super-paradigm. In the course of inheriting form rules, in step 48, a check for divergence is performed as in step 58A (FIG. 2E). If divergence is in fact detected, as in step 138 (FIG. 2E) described above, then a cycle check must be performed on the path with the superseding intermediate form rule (if the original form rule is a surface form rule). If the processor 6 did not perform this cycle check, then there could be the situation in which paradigm verb_er shares (i.e., inherits) prés_1s, which is declared in the super-paradigm verb-root (APPENDIX III) as follows:

prés 13: BASE+"es"

where BASE is declared as:

BASE=inf+"s".

Assuming that BASE was also declared in verb_er (i.e. the latter paradigm) superceded BASE as follows:

BASE: prés_13="es"

that would constitute a cycle, or an illegal path. Therefore, all divergent paths must also be checked for cycles. When the processor 6 invokes the cycle checking procedure in step 58 (FIG. 2A), however, this same path will not be checked, because only paths (chains) originating at the current paradigm will be checked, whereas the paths checked in step 58A (FIG. 2E) originated in the super-paradigm.

Referring again to FIG. 2E, in step 140, the original form rule is not a surface form rule, the processor 6 proceeds to step 146, where it will add to the node of that stem, reference to the superseding paradigm and a reference to the superseding form rule including the identification of the superseding paradigm and a reference to the superceding form. Once the divergence is made in step 148, the processor in step 148 returns to step 127 in FIG. 2D.

Referring again to step 140 in FIG. 2E, if the original form rule was a surface form rule, then a cycle check must be made in step 58A. As described above, cycle check is a procedure to check the chain of form rule references in the form rule stems to determine whether each form rule chain of references resolves to a LEX identifier. The process for cycle checking is described in detail below with reference to FIG. 2G. Referring again to step 58A in FIG. 2E, if the cycle check procedure identifies a cycle, the processor 6, in step 144, will generate an error and proceed, in step 148, to return to step 127 in FIG. 2D.

Otherwise, if no cycle is found, the processor 6 will continue to step 146 and add to the stem's list of divergents, the identification of the superseding paradigm and a reference to the superseding form. Like the form rule "sharing" information described above, diverging form rule information is also stored in the rule information data structure 20 on lists associated with the relevant form rule. Where a stem form rule is superseded, an identifier to the superseding paradigm and a reference to the superseding form rule associated with the superseded stem of the super-paradigm form rule, provides a branch that will enable the processor 6, in the run-time phase, to follow the correct path for any given form rule in any paradigm. This maximizes the amount of form rule sharing, while allowing for branching at any point in the form rule reference chain.

Referring again to step 146, FIG. 2E, once the reference to the divergent form rule is placed in the stem, the processor in step 148 returns to step 127 in FIG. 2D.

d. Cycle check and Feature Propagation

Cycle check processing as described above checks the chain of form rule references starting at each surface form rule to insure that each form rule eventually resolves to a LEX token, i.e., a reference to the lexicon. In FIG. 2A, the cycle check process is invoked in step 52 during the processing of the form rules for each paradigm. The cycle check procedure is also invoked during the divergence checking process in step 52 at FIG. 2E to insure that where the path of an inherited form rule diverges, the path of divergence also does not contain a cycle.

Figures 1, 2F:
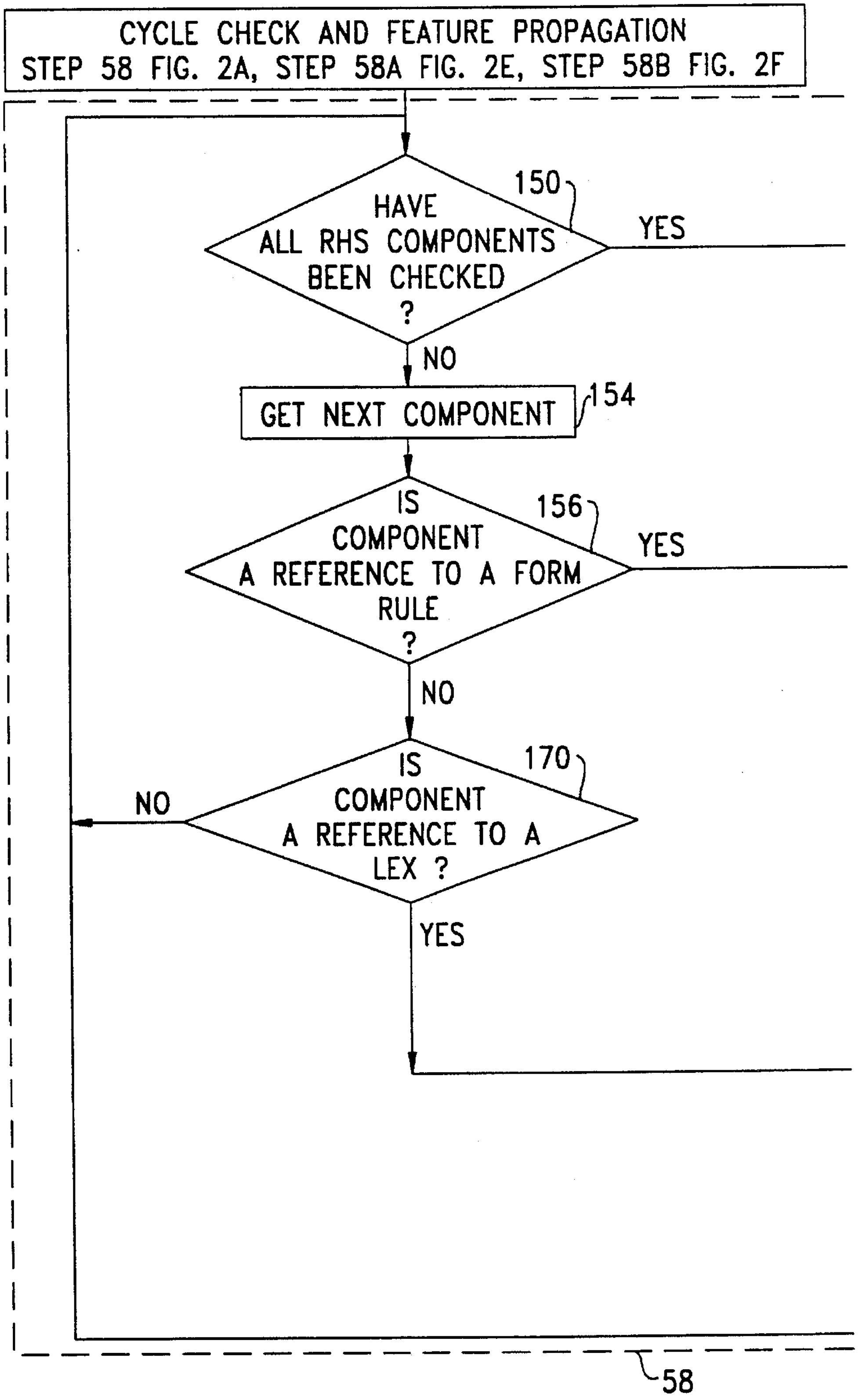
FIG. 2F Depicts an exemplary process flow of a cycle check and feature propagation function of the compiler module of the present invention.
Figures 2, 2F:
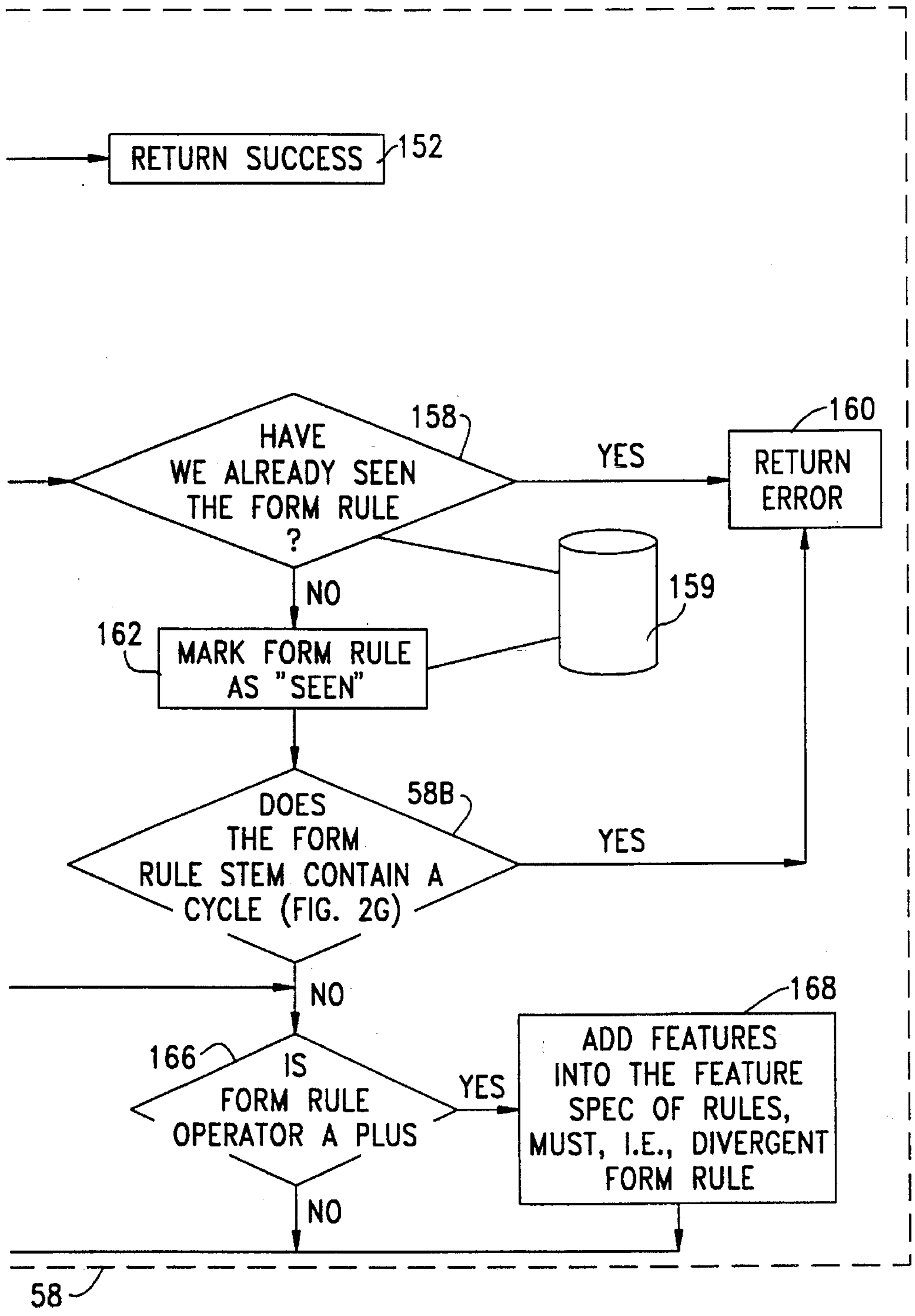

FIG. 2F provides an exemplary process flow of the cycle check procedure of step 52. In addition to cycle checking, this procedure will also propagate features for all form rules having a +operator in the present invention.

Processing begins in step 150 with the processor taking a surface form rule as input and beginning to process each component of its right-hand-side. In step 150, if there is a right-hand-side component to check, the processor in step 154 will get the next component and proceed to step 156. In step 156, the processor determines whether the component references a form rule. If so, the processor 6 next determines in step 158 whether or not the form rule reference has already been seen in this cycle check. To make this determination, the processor 6 will scan the entries in a form rule list 159. Initially the list will be empty. If, in step 158 the stem form rule reference has not been "seen", the processor 6, in step 162, will mark the rule as being seen by adding the reference to the form rule list 159. Proceeding to step 58B, the processor 6 will now follow the chain of form rule references in step 58B, recursively calling this cycle check procedure, passing the stem form rule as the argument. If the recursive call in step 58B to the cycle check procedure discovers a cycle, the processor 6, in step 160, will end the cycle check and also return an error to step 52 in either FIGS. 2A or 2D (depending on where the call was made).

Figure 2G:
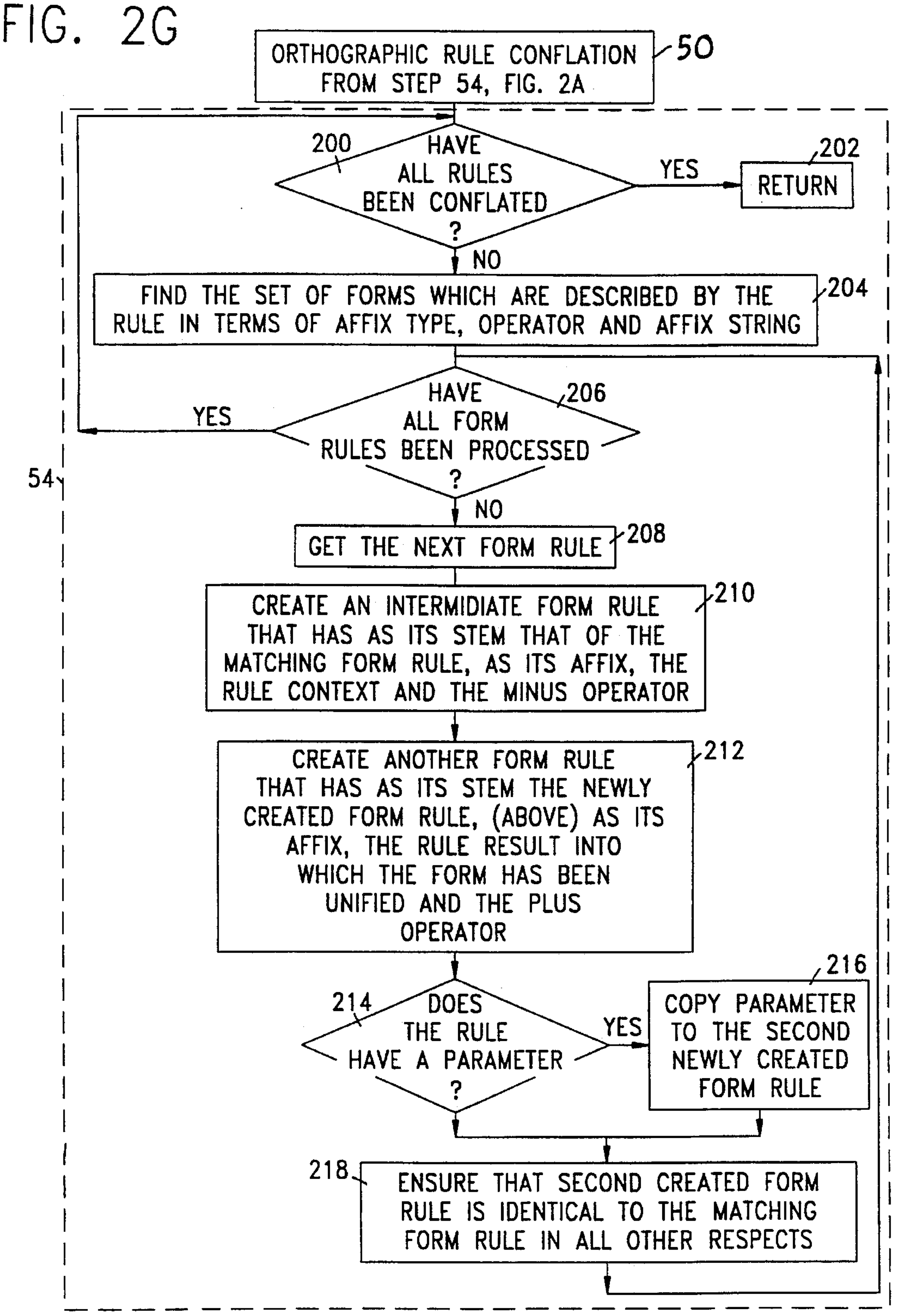
FIG. 2G Depicts an exemplary process flow of an orthographic rule "conflation" function of the compiler module of the present invention.

Referring again to step 58B, in FIG. 2G, if the recursive cycle check returns no cycle error (i.e., the cycle check is false), the processor 6 proceeds to step 166 to determine whether the form rule operator occurring in the right-hand-side (RHS) of the surface form is a plus (+). If the operator is a plus, then the processor will perform the function of feature propagation for the surface form being checked.

As stated above, the feature propagation process propagates features (corresponding to the morpho-syntactic properties of a word form) from the intermediate forms of a form and associates them with the surface form. This process gives the user of the M language syntax an added convenience because he or she need specify the grammatical features only once rather than over and over for each surface form rule that references a given intermediate rule. In step 168 the processor 6 propagates the form features associated with the intermediate form rule adding them into the feature specification of the surface form rule.

Once the features of the component are propagated in step 168, the processor 6 returns to the beginning of the cycle check loop and step 150 to process another RHS component. If in step 150 there is another component to process, the processor 6, will in step 154 retrieve that component and proceed to step 156, if the component is not a reference to a form rule. The processor 6 next proceeds to step 170, where it determines whether the component is either an affix variable or a LEX identifier. When the processor 6 finds a LEX, it has hit the end of the form rule reference chain and here the processor 6 takes the features associated with the form rule where the 'LEX' was encountered and passes them to the previous cycle check procedure call, where the cycle procedure call was recursively invoked from step 58B (FIG. 2F), the form features will bubble back up the chain, each form rule adding its features into the feature specification that was passed back up the chain, and which eventually gets passed to the original caller, which adds them to the feature specification of the surface form rule. Additionally, the syntax of the M language 12 treats the affix variable name as a feature and the set of associated affix strings are treated as the range of that feature's values. This feature must also be propagated to the surface form. This is necessary because the value of the affix is dependent on the lemma. Therefore, the value must be obtained during generation so that the appropriate affix is used during form construction; during recognition, the value is obtained by matching the surface string against each value of the affix_var. Then that value must match the value associated with the lemma in the lexicon, i.e., that value is a feature constraint that must unify with the features of the lemma. If in step 170 the processor 6 determines that the component is either a LEX or an affix variable reference, the processor 6 will proceed to propagate features associated with form rule, but only if the form rule operator is a plus. In step 166, the operator is checked, and in step 168 the processor 6 propagates these features by passing references to then back up to the caller.

From step 168, the processor 6 returns to step 150 to process another RHS component of the form rule if any remain. If none remain, the processor returns in step 152 setting a success flag to true, and cycle check processing is complete.

e. Orthographic Rule Conflation

Referring again to step 54 in FIG. 2A, an exemplary process flow for the process of orthographic rule "conflation" is depicted in FIG. 2G. The present invention provides a method by which a user can specify a description of a language allowing specifications of orthographic rules separate from the specification of the grammatical paradigms. In the compiling process, the present invention automatically applies the orthographic rules across the paradigms to the appropriate form rules, without the user having to specify the application.

Referring to FIG. 2G, the processor 6 in step 200, begins a loop to process each orthographic rule declared in the user prepared declarative rules 16 (FIG. 1). If there are orthographic rules to process, the processor, in step 204, attempts to locate a set of form rules which are described by or match the characteristics of the orthographic rule. To find a match the processor will compare the left-hand-side of the orthographic rule to the right-hand-side of the form rule attempting to match the affix type (i.e., prefix or suffix) operator (i.e., plus [+] or minus [−]) and affix string. For example, in step 204, assume that an orthographic rule has been declared:

```
orthographic_rule {
    SUFFIX [dent] + ["t"] — [dental "et"]
}
```

In step 204 the processor 6, may arrive at the following form rule:

```
        imp_2s: IMP + "test"
        IMP: BASE
and     BASE: inf – "en"
```

It is possible that the orthographic rule might apply to imp_2s, because the affix in the form rule is a suffix, the operator is a plus and the first letter in the form rule affix is a "+", thus matching the "t" affix string in the orthographic rule. The processor 6 will attempt to match all form rules (both surface and intermediate) to the orthographic rule.

After the attempt to match all the form rules with the orthographic rule in step 204, the processor 6 next begins a loop in step 206 to "conflate" each of the matching form rules. If the processor 6 determines there are additional rules to conflate, the processor proceeds to step 208 and retrieves the form rule. To conflate the form rule, the processor will first create an intermediate form rule called an inner variant form rule or "inner variant", that has the same stem as the matching form rule, but which uses as its affix the context of the orthographic rule and the minus operator. In the example above, the inner variant form rule created would be:

```
imp_2s *1*1:Imp–[dent]
```

where [dent] is the context of the orthographic rule.

In step 212 the processor next proceeds to create an additional form rule variant called an outer variant. The outer variant has RHS components comprising: as a stem the inner variant form rule just created, and as its affix the right-hand-side result of the orthographic rule as unified with the affix of the form rule. The operator for the outer variant is the plus operator. In the example above, the outer variant form rule will be:

```
imp-2s *S*1:Imp–2s*1*1+[dental "et" "est"]
```

From step 212, the processor 6 proceeds to step 214 where it determines whether the orthographic rule contains a parameter. Parameters are used with orthographic rules to limit their application to a subset of all lemmas having the appropriate characteristics to which the orthographic rule could apply. Where an orthographic rule has a parameter, it is associated with the outer variant so that the variant form rule will match only those words whose lexicon entries also provide for the parameter. In step 214, the processor 6 determines whether the orthographic rule has a parameter. If so, in step 216, the processor 6 provides for control of orthographic rule application, through the lexicon entry, by copying the parameter to the outer variant form rule. If the orthographic rule does not have a parameter then it will always apply, so long as the conditions of the context are met. In the example above, the orthographic rule has no parameter.

In either case of whether the orthographic rule does or does not have a parameter, the processor in step 218 will undertake to ensure that the outer variant (second created) form rule is identical in all other respects to the matching form rule from which it was derived.

The procedure in step 218 involves the final step of creating the outer variant. All the other data associated with the "source" or matching form rule are associated with the outer variant. This includes the feature specification, whether the form rule is surface or intermediate, whether it can be overriden, and the set of paradigms that share it. After step 218 the processor 6 loops to step 206 to determine if there is another matching form rule. If so, the processor will proceed to step 208 to get the form rule and conflate it as described. When all of the matching form rules have been conflated, the processor 6 returns to step 200 to determine whether there are any other orthographic rules to process, and if so, processes them accordingly. Otherwise the processor 6 returns to step 54 in FIG. 2A.

f. Building a discrimination Net

Referring again to FIG. 2A, the processor 6 completes the compilation process by building the discrimination net 21 (FIG. 1) that will be used for the process of morphological recognition in the run-time phase. To construct the discrimination net 21, the processor 6 will access the rule information data structure 20 for form rule and other information. The discrimination net 21 is a data structure in which affix characters from all concatenating suffix form rules and their associated variant forms are given corresponding nodes which are formed into a network, so that the suffix of the surface string to be recognized can be most efficiently matched against all possible form rules. In the present invention, only concatenating suffix surface form rules are used to create the discrimination net, excluding all prefix surface form rules and all surface form rules where a suffix is stripped from the stem. These surface forms are excluded from the indexing procedure, because the complexity they would add to the discrimination net far outweighs any advantage of their inclusion, given the rare occurrence of such surface form rules. The interconnections between the nodes for the elements of the suffix comprise a path from the last character in the suffix to a terminal node, which represents the stem of the form rule and contains information that enables a recognizer function to continue down the chain(s) of form rule references. The discrimination net is constructed by looping through all the surface form rules and building in a path for each +SUFFIX form rule. All of the other surface form rules, i.e., all PREFIX and −SUFFIX form rules, are stored in the non-netted set 23.

Generally, there are three types of suffixes to index, because an affix can comprise either a string of literal characters, an affix variable, or an affix sequence. The affix sequence, as mentioned above, is a representation of an affix consisting of a sequence of character strings and or orthographic rule variables. An affix sequence occurs only in the variant form rules created during the orthographic rule conflation process (see step 54, FIG. 2A, and see FIG. 2G). The processor 6 must adequately handle each of those possible affixes in building the discrimination net 21 for concatenating suffix surface form rules.

Generally, when a character is encountered, the processor will create a character node for the character (or re-use a previously existing character node, if one exists for the character), and then use it to create a path to a terminal node. Initially, the present invention provides an initial array of character nodes, each node corresponding to a letter of the natural language. For example, each letter of the English alphabet would have an initial character node. A character node is a data structure comprising a character identifier and set of pointers to subsequent nodes. Character nodes can point to other character nodes, variable nodes and termination nodes. An affix variable node handles the special case of the variable appearing in the affix sequence of a variant form rule created during orthographic rule conflation. As described above, a variable used in an orthographic rule is associated with a set comprising character strings over which the variable may range. The affix of a variant form rule may contain a sequence of strings and/or variables e.g., such as the result sequence for the orthographic rule for geminating the consonant preceding a mute "e" in the French language [vowel gcons gcons "es"]). This sequence must also be mapped into the discrimination net. Generally, where a variable occurs in mapping the suffix of a variant form rule, the processor 6 creates a variable node. Like the character node, the variable node contains an identifier and a set of pointers to subsequent character, variable and terminal nodes. However, the present invention provides that the variable node also contain a flag to indicate whether in the path that a particular variable is bound, i.e., whether it has already been encountered in the path, and therefore must have the same value as when it was previously encountered.

Assuming the following orthographic rule:

```
! geminate the consonant preceding a mute-e syllable
SUFFIX (GEM) [vowel gcons] + ["e#"] → [vowel gcons
gcons "e#"]
```

There could be a surface variant form rule created having as an affix the affix sequence: vowel gcons gcons "e".

As the discrimination net is built, the character "e" is first indexed; then gcons, then gcons, and then vowel, followed by a termination node. In the example, there are two gcons variables. As described above, the gcons variables are used to identify the same literal character for a given application. In the run-time morphological recognition phase, as characters are matched against the discrimination net for recognition, the value of the first gcons value dictates what value the second gcons value must have. And in this sense, the value of the second gcons variable is "bound" to the value of the first gcons. Generally, when the processor 6 creates a variable node, it checks a list of bound variables to determine whether this variable has been yet encountered in creating the suffix path. If so, the processor 6 will mark that variable nodes as bound, by setting a flag to true.

In the present invention, a form rule that has an affix variable as its suffix, also requires some special processing when indexing it into the discrimination net. As described above, an affix variable is used to represent a set of alternative affix strings. Generally, for each affix string in the set, the processor 6 will create a path to a termination node.

The termination node comprises a list of suffix surface form rules, having the affix that corresponds to the path in the discrimination net that leads to that node. Associated with each surface form rule reference in the termination node is also a list references to the primary and divergent stem form rules that comprise the right-hand-side stem of the surface form rule. Further associated with each stem form rule are the set of paradigms comprising an intersection between the set of paradigms that share the surface form rule and the set of paradigms that share the stem form rule. As will be described below, that information in the termination node provides information to enable the processor during recognition to avoid taking incorrect divergent paths.

Figure 2H:
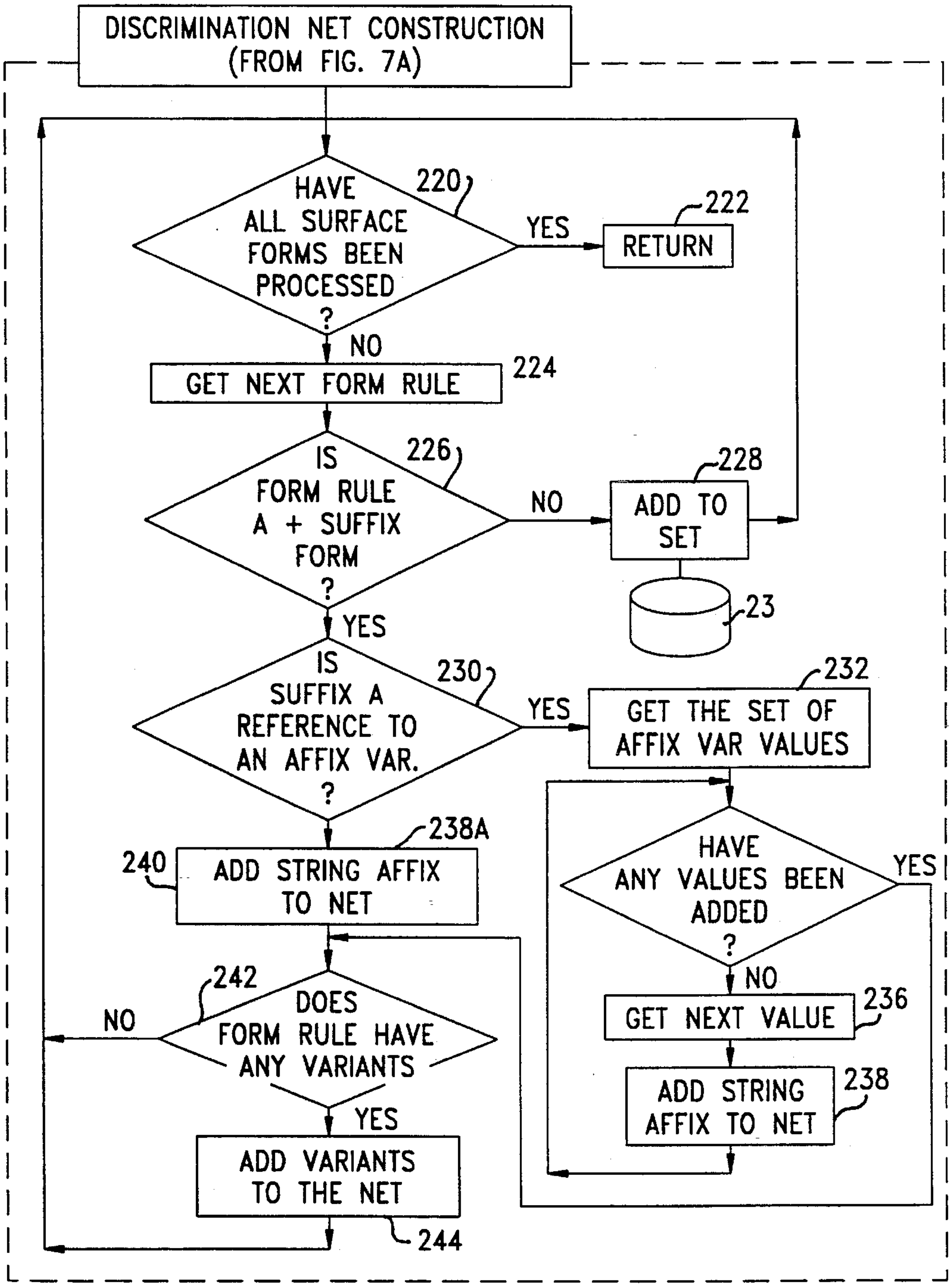
FIG. 2H Depicts an exemplary process flow of a discrimination net building function of the compiler module of the present invention.

FIG. 2H depicts an exemplary process flow of the discrimination net building process referenced above in step 56 (FIG. 2A). Referring to FIG. 2H, the processor 6, in step 220, begins a loop to process each surface form rule in each paradigm of the user prepared declarative rules 16 (FIG. 1). If, in step 220, there are surface form rules to process, in step 224, the processor 6 will retrieve a form rule and proceed to step 226. The processor 6, in step 26, determines whether the form rule is a concatenating suffix form rule (i.e., it determines whether the right-hand-side of the form rule contains a suffix and a plus (+) operator). Only concatenating suffix surface form rules are used to create the discrimination net, excluding all prefix surface form rules and all surface form rules where a suffix is stripped from the stem. Referring back to step 226, if the form rule is not a concatenating suffix surface form rule, it, in step 228, is added to a separate non-netted set 23, and the processor 6 returns to the top of the loop at 220 to process another surface form rule. Although not included in the discrimination net 21, the surface form rules stored in the non-netted form rule set 23 will also be used in run-time phase recognition processing, as will be described below.

Referring again to step 226, if the form rule is a concatenating suffix surface form rule, the processor 6, in step 230, will first determine whether the suffix is an affix variable. If so, the processor 6 proceeds to step 232 to retrieve the set of affix variable values from the rule information data structure 20. With that set of character strings, the processor 6 begins a loop to index the form rule using each member of the affix variable set.

In step 234, the processor 6 determines whether there are any more affix variable set members to index. If so, in step 236, the processor 6 retrieves the next value and, in step 238, invokes a procedure to index the affix string into the discrimination network.

Figure 2I:
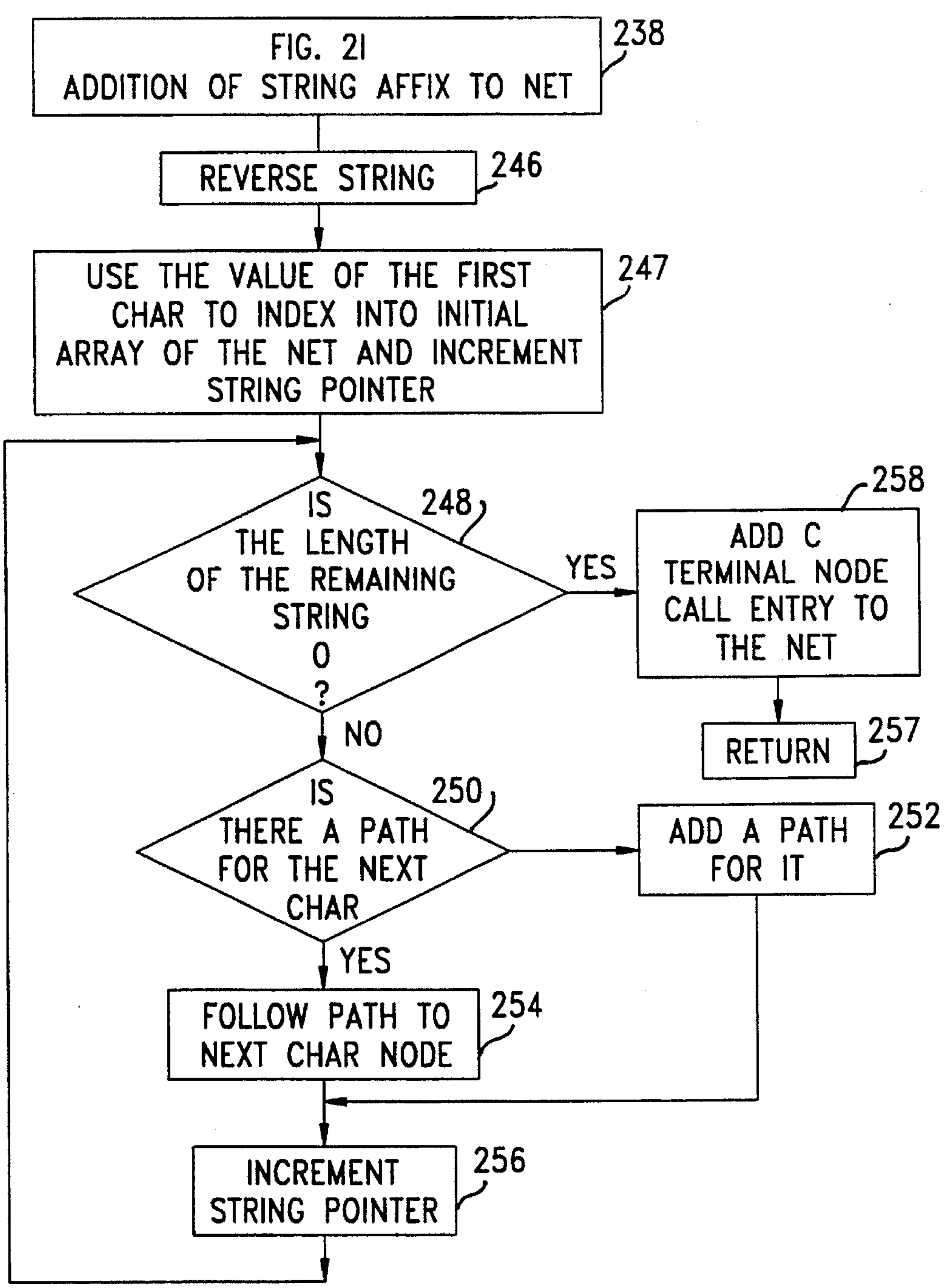
FIG. 2I Depicts an exemplary process for the addition of an affix string into a discrimination net according to the present invention.
Figure 2J:
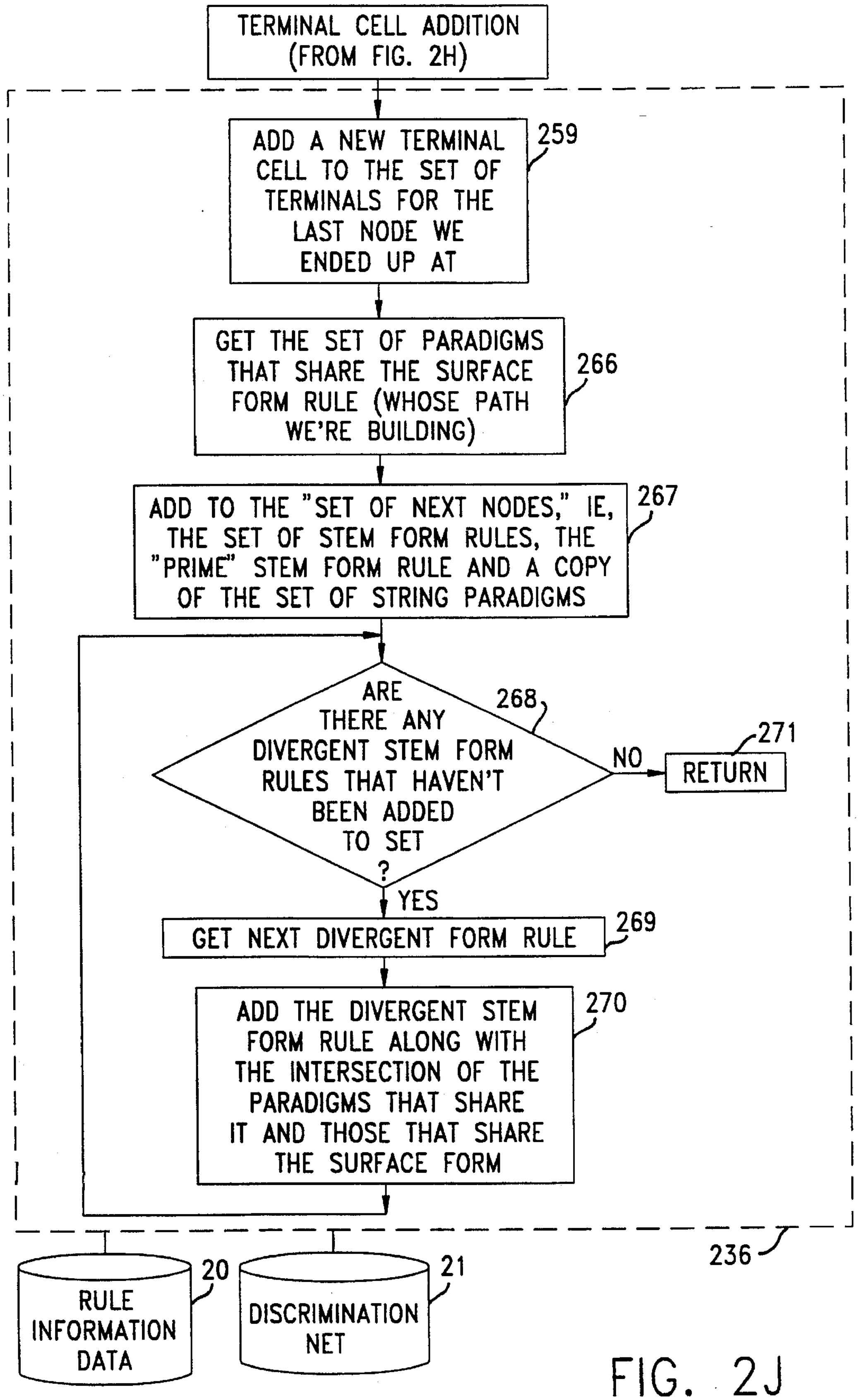
FIG. 2J Depicts an exemplary process flow of a discrimination net terminal cell addition function of the compiler module of the present invention.

FIG. 2I depicts an exemplary process procedure for adding a character string into the discrimination network 23. Upon the receipt of the character string, the processor 6, in step 246, will reverse the characters of the suffix string and, in step 247, it will use the value of the first character to index into the initial array of the discrimination net (i.e., find the start node). A string pointer is used by the processor 6 as a placeholder in the reversed affix string. As described above, the initial array is a data structure comprising character nodes corresponding to each possible character in the natural language. The string pointer, used to move through the suffix string, will be incremented; and the initial node reached is the "current" node.

In step 248, the indexing procedure continues with a loop to process the remaining characters of the suffix. In step 248, if the processor 6 determines that there are more string characters to process, it proceeds to step 250 to determine whether there is a path already established for the character from the initial indexing point. Many form rules will have the same suffix endings. Thus, as a discrimination net is constructed, the same suffix path may have already been established. The processor 6, in step 250, checks for additional character paths by checking any character nodes that are connected to the current node by a character pointer. If the current character matches a linked character, in step 250, the processor 6 proceeds to step 254 and follows the path to the next character node. In step 256, the string pointer is incremented, and the processor 6 returns to the beginning of the character processing loop at step 248.

Referring back to step 250, if a path for the current character does not exist, the processor 6 will proceed to step 252 and create a node path for this character. As stated above, a character node is a data structure containing a character identifier and 3 sets of pointers to other character nodes, variable nodes and terminal nodes, respectively. In step 252, the processor 6 will create a character node for the character, linking that new character node to the current node. After creating the path for the second character in step 252, the processor 6, in step 256, increments the string pointer and proceeds to the beginning of the affix element processing loop in step 248. If there are no more characters in the string to process, the processor 6, in step 258, then adds a terminal node to the network. As stated above, the termination node comprises a list of concatenating suffix surface form rules whose affix corresponds to the path to the termination node. Associated with each form rule reference in the terminal node are the stem form rules for the node and for each stem rule, the set of paradigm references comprising the intersection of the set of paradigms sharing that stem form rule and the set of paradigms sharing that stem form rule. This information allows the processor 6 in the recognition phase, to adhere to valid paths, without crossing over at points of divergence.

An exemplary process flow for the process in step 258 of creating a terminal node and placing in it the appropriate path tracking information is depicted in FIG. 2I. In step 259, the processor 6 creates a new node link to the current node using a termination node pointer from the current node. In step 260, the processor 6 next retrieves for the form rule the set of paradigm references that share it. This information associated with the node for the form rule. In step 267, the processor 6 adds to the termination node the form rule whose path is being followed and a list of its stem form rules. This information also is found in the rule information data structure 20, associated with the node for the form rule. The list comprises the stem form rule list (the "prime" stem form rule) plus any divergent stem forms found to be associated with the form rule in the rule information data structure 20. If, in step 268, there are divergent stem form rules, the processor 6, in step 269, references the paradigm "sharing" information associated with that divergent stem form rule (i.e., the sharing information in the rule information data structure 20), and, in step 270, returns the intersection between the set of paradigms that share the form rule and the set of paradigms that share the stem form rule. The process then returns to step 268 to process another divergent stem form. As described above, when all of the divergent stem form rules are processed, the processor 6 returns to step 271 in FIG. 2I.

Referring again to FIG. 2I, the processor 6, in step 257, then returns to step 238 in FIG. 2H. Referring again to step 238 in FIG. 2H, the processor 6 returns to step 234 to process the remaining members of the affix variable set as described above. When all the members have been indexed, the processor proceeds to step 242 to begin processing the variant form rules of the current form rule as will be described below.

Referring again to step 230 in FIG. 2H, if the affix contains only a character string, the processor will proceed to step 238A to invoke the procedure to add that suffix string to the discrimination net as described above with reference to FIGS. 2I and 2J.

Figures 1, 2K:
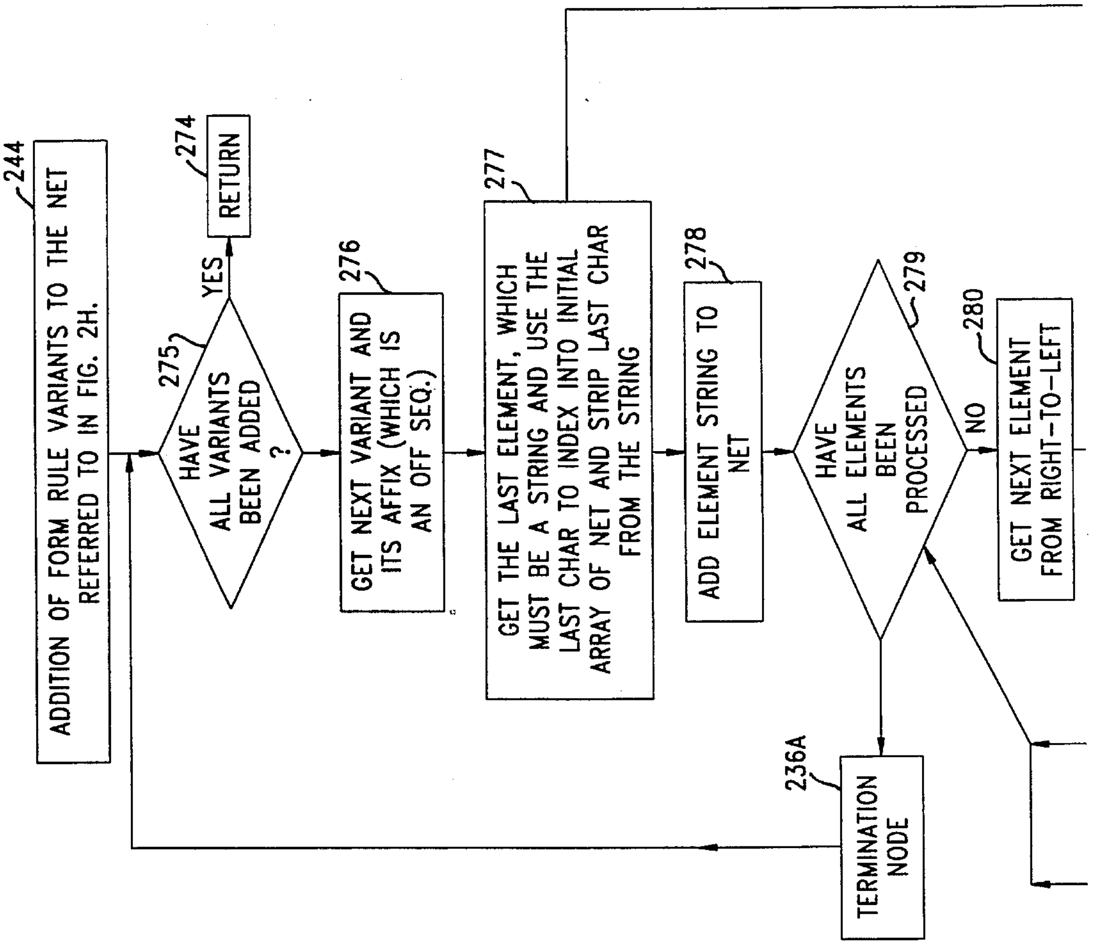
FIG. 2K Depicts an exemplary process flow for a procedure for the addition of form rule variant into a discrimination net according to the method of the present invention.
Figures 2, 2K:
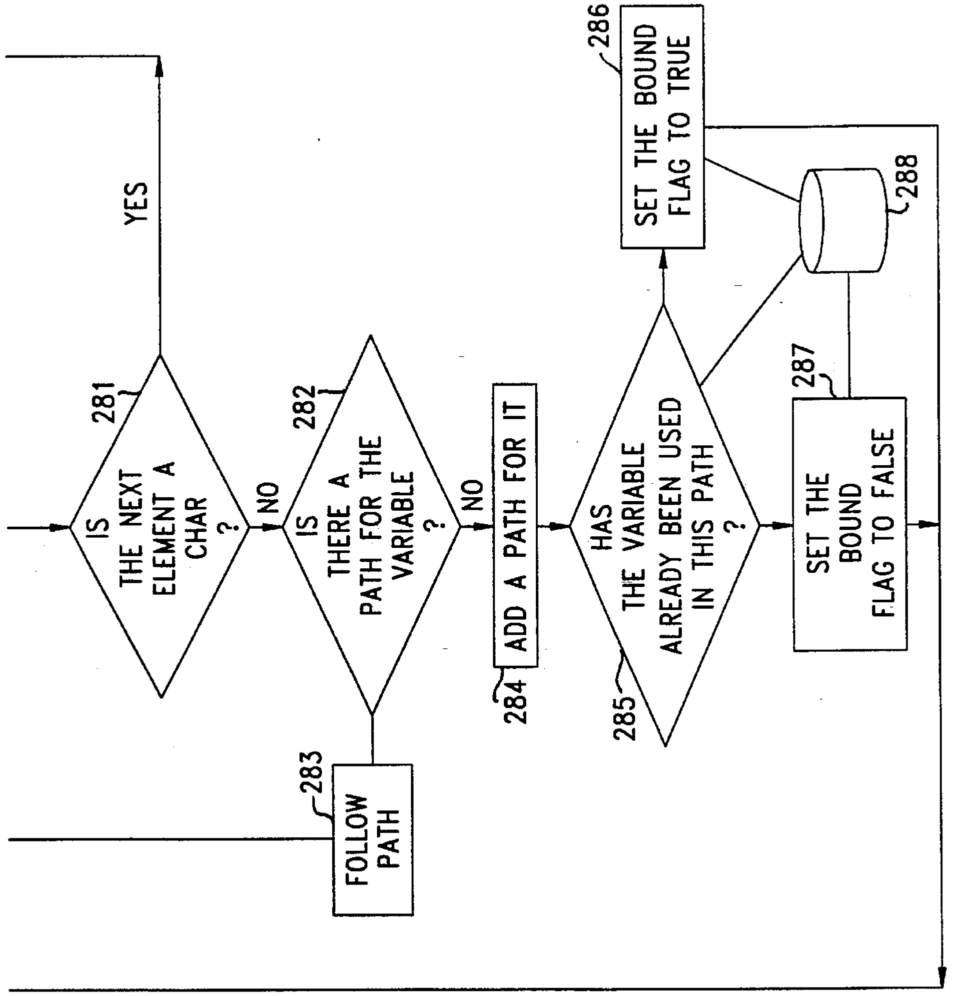

With the discrimination net processing of the form rule affix complete, the processor 6, in step 242, will access the information data structure to determine whether the form rules have associated variants to add into the net. If there are no variants, in step 242, the processor 6 will return to the beginning of the discrimination net construction loop at step 220 to begin processing another surface form. However, if the current surface form rule has associated form rule variants, the processor 6, in step 244, will invoke a procedure to add the variant form rules into the discrimination net 21, which is described in detail with reference to FIGS. 2J and K. Referring to FIG. 2K, the processor 6 begins loop a to add each variant associated with the form rule into the discrimination net. In step 275, the processor 6 determines whether there are additional variant form rules to process. If so, in step 276, the processor 6 gets the variant form rule. Because the variant form rule results from the orthographic rule conflation process (see step 212, FIG. 2G), the variant's affix will always be an affix sequence (i.e., a sequence of character strings and variables), the last element of which will be a string of one or more characters. In step 277, the processor 6 gets the last character of the string and indexes it into the net in a process as described above.

Figure 2L:
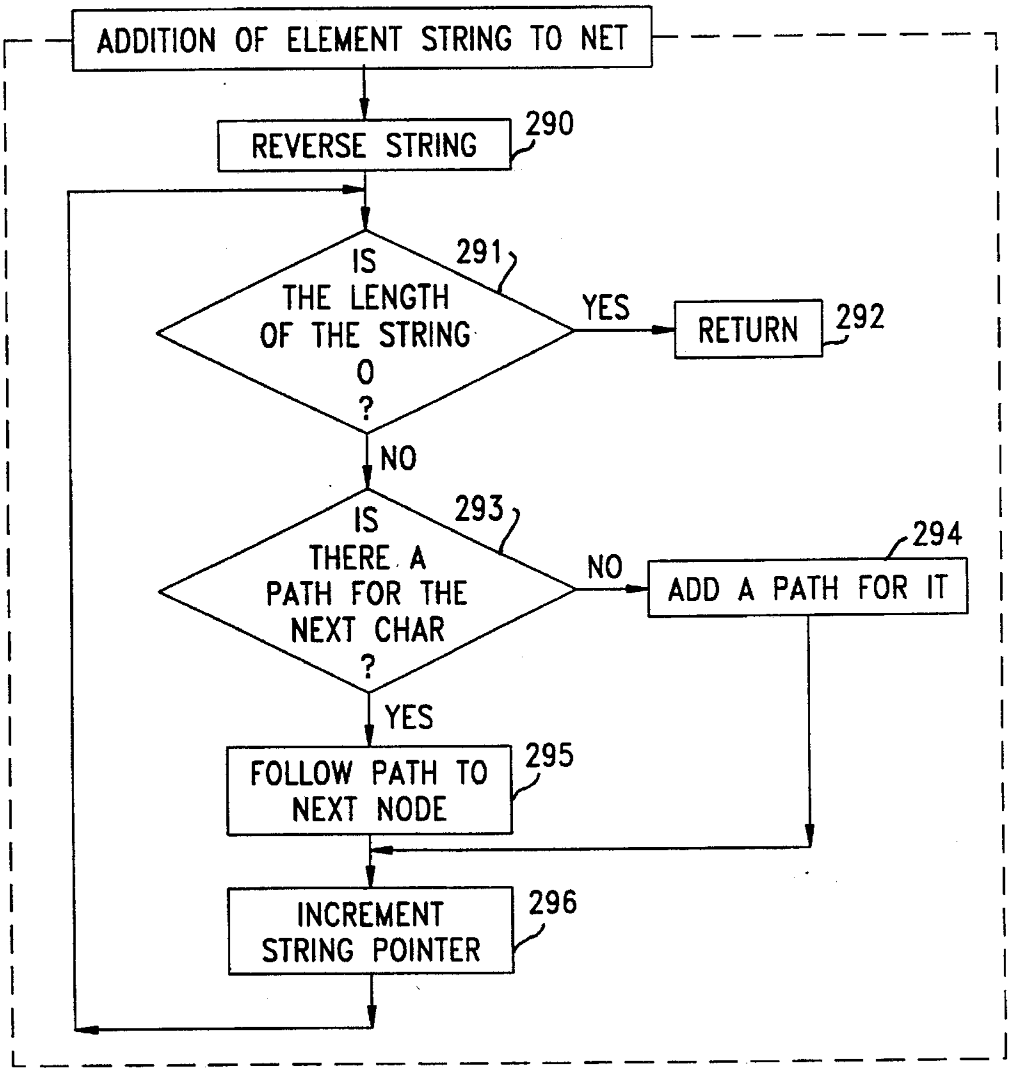
FIG. 2L Depicts an exemplary process plan for a process to add a string element of an affix sequence variable into a discrimination net according to the method of the present invention.

Then, in step 278, the processor 6 invokes a procedure to add the remaining string into the net, which is described in detail referring to FIG. 2L.

Referring to FIG. 2L, the processing of the affix sequence character string is similar to the process described above. With reference to FIG. 2I, however, here the string will not necessarily lead directly to a termination node. Referring to FIG. 2L, the processor, in step 291, begins a loop to process the remaining characters of the string. In step 291, if the processor 6 determines that there are more string characters to process, the processor 6 proceeds to step 293 to determine whether there is a path already established for the character from the initial indexing point. The processor 6, in step 293, checks for additional character paths by checking any character nodes that are connected to the current node by a character pointer. If the current character matches a linked character node, the processor 6 proceeds to step 295 and follows the path to the next character node. In step 296, the string pointer is incremented, and the processor 6 returns to the beginning of the character processing loop at step 291.

Referring back to step 293, if a path for the current character does not exist, the processor 6 will proceed to step 294 and create a node for this character. In step 294, the processor 6 creates a character node for the character, and links that new character node to the current node. After creating the path for the second character in step 294, the processor 6, in step 296, increments the string pointer and proceeds to the beginning of the affix element processing loop in step 290. When all the characters of the string have been added, the processor 6, in step 292, returns to step 278 in FIG. 2K.

Referring again to FIG. 2K, once the string representing the last element of the affix sequence has been added to the discrimination net, the processor, in step 279, begins a loop to process the remaining elements of the affix sequence in a right-to-left order. The remaining elements can be either character strings or variables.

In step 279, the processor 6 determines whether there are any additional affix sequence elements to process. If so, the processor 6 proceeds, in step 280, to get the next element, proceeding from right to left, incrementing an element pointer. In step 281, the processor 6 determines whether the next element is a character, if so, the processor 6 proceeds to step 278 or invokes the procedure to add the string element into the net as described above with reference to FIG. 2L. If, in step 281, the next element is not a string, the processor 6 proceeds to step 282 and begins a procedure to add this variable.

In step 282, the processor 6 will search the set of variable node pointers contained in the current node to determine whether a path already exists from the current node to a variable node that is equivalent to the current variable. If so, in step 283, the processor will follow the pointer to that variable node and, in step 284, increment the element pointer. The processor 6 then returns to the top of the element processing loop at step 279 for further processing.

Referring again to step 282, if no variable pointer in the current node references a variable node for the current variable, the processor 6 in step 284 will create a node for the variable and link it to the current node. In step 285, the processor 6 next determines whether the variable has been used before in the same path by checking a binding list 288. The binding list contains a list of variable names and their "bound" value. If the currently developing path has passed through a variable node, having the same identifier as determined in step 285, the processor 6, in step 286 will set a flag in the variable node to indicate that the variable is already bound to a value. The processor 6 increments the string pointer 289, to get the next element to process and returns to the top of the element processing list at step 279.

Referring again to step 285, if the variable has not yet been encountered along the current discrimination net path, the processor 6 will then proceed to step 287 and add the variable and its location to the binding list 286, and set the bound variable flag within the variable node to false. In step 289, the processor 6 increments the string pointer to locate the next element in the affix string being indexed and returns to step 279 to process anther element if any remain.

If in step 279, there are no more elements to process, the processor 6 has made a path of the elements of the affix sequence. The processor 6 will then return to step 275. Once all the affix sequences for all variant rules have been processed, the processor 6, in step 274, returns to step 244 in FIG. 2H. Referring again to FIG. 2H, the processor 6 returns next to step 220. Once all surface form rules have been processed, the processor 6, in step 222, returns to step 56 FIG. 2A. Referring to step 58 in FIG. 2A, the compiled rule set data structure 20 and the discrimination net 21 that's part of the compiled rule set data structure are saved in the secondary storage for use in the run-time phase.

Referring to FIG. 2A, once the discrimination net 21 and non-netted rule set have been created, the resulting data structure created by the compilation process the processor in step 58 writes the structure to the secondary storage 10 and the compilation process is complete.

The above described exemplary embodiment of the invention is meant to be representative only, as certain changes may be made without departing from the clear teachings of the invention. Accordingly, references should be made to the following claims which alone define the invention.

APPENDIX I

```
/* formal (yacc) syntax */
%{
%}

%start para

%token AF_LABEL AUGMENT AV_LABEL CMP_STRING EX_LABEL FF_LABEL
%token FS_LABEL FV_LABEL IF_LABEL INST_LABEL LEX MEMBER NAME NIL NO OR_LABEL
%token OVERRIDE PARA_LABEL PREFIX PS_LABEL SC_LABEL SET_LABEL SF_LABEL
%token STRING SUFFIX VAR_LABEL YES

%%   /* beginning of rules section */

para_set : para_set_name feat_vals sets vars o_rules paradigms
                {YYACCEPT;}
         ;

para_set_name : PS_LABEL ':' identifier
              ;

identifier : STRING
           | NAME
           | NO
           | YES
           ;

feat_vals : FV_LABEL '{' fv_list '}'
          ;

fv_list : /* empty */
        | fv_list fv_entry
        ;

fv_entry : identifier '=' '(' val_list ')'
         ;

val_list : identifier
         | val_list ',' identifier
         ;

sets : /* empty */
     | SET_LABEL '{' set_list '}'
     ;

set_list : /* empty */
         | set_list set
         ;

set : identifier '=' '(' member_list ')'
    ;

member_list : STRING
            | member_list ',' STRING
            ;

vars : /* empty */
     | VAR_LABEL '{' var_list '}'
```

```
     ;

var_list : /* empty */
           | var_list var
         ;

var : identifier ident_list
         ;

ident_list : identifier
             | ident_list ',' identifier
           ;

o_rules : /* empty */
          | OR_LABEL '{' o_list '}'
        ;

o_list : /* empty */
         | o_list rule
       ;

rule : prefix_rule
       | suffix_rule
     ;

prefix_rule : PREFIX rule_parm p_rule_body
            ;

rule_parm : /* empty */
            | '(' neg identifier ')'
          ;

neg : /* empty */
      | '~'
    ;

p_rule_body : rule_op rule_exp rule_exp '-' '-' '>' rule_exp
          ;

rule_op : '+'
          | '-'
        ;

rule_exp : '[' re_list ']'
         ;

re_list : re_item
          | re_list re_item
        ;

re_item : fr_item
          | '"' STRING '#' '"'
          | '"' '#' STRING '"'
        ;

fr_item : '"' STRING '"'
            | identifier
```

```
        ;

form_item : fr_item
          | LEX
          | NIL
          ;

suffix_rule: SUFFIX rule_parm s_rule_body
           ;

s_rule_body : rule_exp rule_op rule_exp '-' '-' '>' rule_exp
            ;

paradigms : paradigm
          | paradigms paradigm
          ;

paradigm : PARA_LABEL ':' identifier '{' para_header para_body '}'
         ;

para_header : super_class inst_flag exemplar
            ;

super_class : /* empty */
            | SC_LABEL ':' identifier
            ;

bool : YES
     | NO
     ;

inst_flag : INST_LABEL ':' bool
          ;

set_member_name : identifier
                | set_member_name '.' identifier
                ;

exemplar : /* empty */
         | EX_LABEL ':' exemp_item
         ;

exemp_item : STRING
           | CMP_STRING
           ;

para_body: sets vars o_rules form_sets affix_vars int_forms surf_forms
           form_feats
         ;

form_sets : /* empty */
          | FS_LABEL '{' fs_list '}'
          ;

fs_list : /* empty */
        | fs_list fs_entry
        ;
```

```
fs_entry : identifier '=' '(' form_name_list ')'
        ;

form_name_list : set_member_name
                | form_name_list ',' set_member_name
              ;

affix_vars : /* empty */
            | AV_LABEL '{' affix_list '}'
          ;

affix_list : /* empty */
            | affix_list affix_var
          ;

affix_var : identifier '=' '(' affix_string_list ')'
         ;

affix_string_list : STRING
                   | affix_string_list ',' STRING
                 ;

int_forms : /* empty */
           | IF_LABEL '{' form_list '}'
         ;

form_list : /* empty */
           | form_list form
         ;

form : set_member_name ':' form_rhs feat_spec qualifiers
    ;

form_rhs : form_item
          | rule_op form_item form_item
          | form_item rule_op form_item
        ;

feat_spec : /* empty */
           | '[' feat_set ']'
         ;

feat_set : feat_list
          | feat_set ';' feat_list
        ;

feat_list : att_val
           | feat_list ',' att_val
         ;

att_val : set_member_name '=' set_member_name
       ;

qualifiers : /* empty */
            | '/' qual_list
          ;
```

```
qual_list : qual
          | qual_list ',' qual
          ;

qual : OVERRIDE
     ;

surf_forms : SF_LABEL '{' form_list '}'
           ;

form_feats : /* empty */
           | FF_LABEL '{' form_feat_list '}'
           ;

form_feat_list : /* empty */
               | form_feat_list form_feat_list_item
               ;

form_feat_list_item : set_member_name feat_spec
                    ;

%% /* beginning of program section */
```

APPENDIX II

```
! This file represents the inflectional paradigms for German

para_set_name: german


! Form features and their range of values

feature_values {
        tense = (present_indicative, imperfect, present_subjunctive,
                 special_subjunctive, past_participle)
        person = (1, 2, 3)
        number = (singular, plural)
        non_finite = (true, false)
        unattached = (true, false)
}

! Universal orthographic rules (applied to stem and word rules)

sets {
    LETTER = (A,B,C,D,E,F,G,H,I,J,K,L,M,N,O,P,Q,R,S,T,U,V,W,X,Y,Z)
    CONS = (B,C,D,F,G,H,J,K,L,M,N,P,Q,R,S,T,V,W,X,Z)
    VOW = (A,Ä,E,I,O,Ö,U,Ü)
    DENT = (D,T,DN,TM,CHN,FN,GN)
    SIB = (S,X,Z)
    L_R = (L,R)
}
vars {
    VOW         vowel
    LETTER      char
    CONS        const
    DENT        dental
    SIB         sibil
    L_R         l_or_r
}
ortho_rules {
    ! drop only the "n" of infinitives ending in -eln or -ern to form BASE
    ! eg, klingeln --> klingel
    SUFFIX [const "E" l_or_r "N"] -["EN"] --> [const "E" l_or_r]

    ! drop the "e" in the BASE of -eln and -ern infinitives when adding the
    ! present tense 1st person sing ending, eg, klingel --> klingle
    SUFFIX [const "E" l_or_r] +["E#"] --> [const l_or_r "E"]

    ! add only "n" to the BASE of -eln and -ern infinitives when adding the
    ! present tense 1st and 3rd person plural ending, eg, klingel --> klingeln
    SUFFIX [const "E" l_or_r] +["EN"] --> [const "E" l_or_r "N"]

    ! ensure that participle has no more than one unstressed prefix and that
    ! weak verbs ending in -ieren do take ge- prefix, eg,
    ! bestellen --> bestellt and studieren --> studiert
    PREFIX (NO_GE) +["GE"] [char] --> [char]

    ! insert "e" before suffixes beginning with "t" when base ends in a dental,
    ! eg, arbeit --> arbeitet; the param is needed to weed out the weak verbs
    ! that are irregular in the imperfect, eg, senden --> sandte
    SUFFIX (~IRREG) [dental] +["T"] --> [dental "ET"]
```

```
    ! insert "e" before present tense of 2nd person singular when base
    ! ends in a dental, eg, arbeit --> arbeitest
    SUFFIX [dental] +["ST#"] --> [dental "EST"]

    ! drop "s" from present tense 2nd person sing when base ends in a sibilant,
    ! eg, tanz --> tanzt
    SUFFIX [sibil] +["ST"] --> [sibil "T"]
}

! Verb rules

! The following paradigm is for weak verbs.

paradigm: verb_weak {
    use_for_instances: true
    exemplar: hassen

    intermediate_forms {
        BASE: inf -"en"
        PP_BASE: BASE +"t"                          /allow_lexical_override
        IMP: BASE                                   /allow_lexical_override
        SUB1: IMP  [tense = present_subjunctive]  /allow_lexical_override
        SUB2: pres_1s -"e"  [tense = special_subjunctive]
    }
    surface_forms {
        pres_1s: BASE +"e"
        pres_2s: BASE +"st"
        pres_3s: BASE +"t"
        pres_1p: BASE +"en"
        pres_2p: BASE +"t"
        pres_3p: BASE +"en"

        imp_1s: IMP +"te"
        imp_2s: IMP +"test"
        imp_3s: IMP +"te"
        imp_1p: IMP +"ten"
        imp_2p: IMP +"tet"
        imp_3p: IMP +"ten"

        pres_sub_1s: SUB1 +"te"
        pres_sub_2s: SUB1 +"test"
        pres_sub_3s: SUB1 +"te"
        pres_sub_1p: SUB1 +"ten"
        pres_sub_2p: SUB1 +"tet"
        pres_sub_3p: SUB1 +"ten"

        spec_sub_1s: SUB2 +"e"
        spec_sub_2s: SUB2 +"est"
        spec_sub_3s: SUB2 +"e"
        spec_sub_1p: SUB2 +"en"
        spec_sub_2p: SUB2 +"et"
        spec_sub_3p: SUB2 +"en"

        past_part: +"ge" PP_BASE
        inf: LEX
    }
```

```
form_features {
    pres_1s [tense = present_indicative, person = 1, number = singular]
    pres_2s [tense = present_indicative, person = 2, number = singular]
    pres_3s [tense = present_indicative, person = 3, number = singular]
    pres_1p [tense = present_indicative, person = 1, number = plural]
    pres_2p [tense = present_indicative, person = 2, number = plural]
    pres_3p [tense = present_indicative, person = 3, number = plural]

    imp_1s [tense = imperfect, person = 1, number = singular]
    imp_2s [tense = imperfect, person = 2, number = singular]
    imp_3s [tense = imperfect, person = 3, number = singular]
    imp_1p [tense = imperfect, person = 1, number = plural]
    imp_2p [tense = imperfect, person = 2, number = plural]
    imp_3p [tense = imperfect, person = 3, number = plural]

    pres_sub_1s [person = 1, number = singular]
    pres_sub_2s [person = 2, number = singular]
    pres_sub_3s [person = 3, number = singular]
    pres_sub_1p [person = 1, number = plural]
    pres_sub_2p [person = 2, number = plural]
    pres_sub_3p [person = 3, number = plural]

    spec_sub_1s [person = 1, number = singular]
    spec_sub_2s [person = 2, number = singular]
    spec_sub_3s [person = 3, number = singular]
    spec_sub_1p [person = 1, number = plural]
    spec_sub_2p [person = 2, number = plural]
    spec_sub_3p [person = 3, number = plural]

    inf [non_finite = true]
    past_part [non_finite = true, tense = past_participle]
  }

  ! The following sample lemmas are provided for purposes of illustration

  ! citation: hassen
  ! paradigm: verb_weak
  ! stems: inf = hassen

  ! citation: studieren
  ! paradigm: verb_weak
  ! stems: inf = studieren
  ! orth_features: NO_GE = yes

  ! citation: haben
  ! paradigm: verb_weak
  ! stems: inf = haben, PP_BASE = habt, IMP = hat, SUB1 = hät

  ! citation: verbringen
  ! paradigm: verb_weak
  ! stems: inf = verbringen, PP_BASE = verbracht, IMP = verbrach,
  !          SUB1 = verbräch
  ! ortho_features:  NO_GE = yes
}

! The following paradigm is for the strong verbs
! NOTE:  all strong verbs undergo a stem change in the imperfect, and
```

```
!       therefore the stem is stored in the lexicon.  Also, PRES_BASE
!       is needed because some verbs undergo a stem change in the present
!       tense 2nd and 3rd person singular only, and therefore we need to
!       provide a separate stem with lexical override.  Likewise, we need
!       to provide a separarte stem for forming the past participle.

paradigm: verb_strong {
    based_on: verb_weak
    use_for_instances: true
    exemplar: braten

    intermediate_forms {
        IMP: LEX
        PRES_BASE: BASE          /allow_lexical_override
        PP_BASE: BASE +"en"      /allow_lexical_override
    }
    surface_forms {
        pres_2s: PRES_BASE +"st"
        pres_3s: PRES_BASE +"t"

        imp_1s: IMP
        imp_2s: IMP +"st"
        imp_3s: IMP
        imp_1p: IMP +"en"
        imp_2p: IMP +"t"
        imp_3p: IMP +"en"
    }

    ! The following sample lemmas are provided for purposes of illustration

    ! citation: braten
    ! paradigm: verb_strong
    ! stems: inf = braten, IMP = briet

    ! citation: befehlen
    ! paradigm: verb_strong
    ! stems: inf = befehlen, PRES_BASE = befiehl, IMP = befahl,
    !        PP_BASE = befohlen, SUB1 - befähl
    ! ortho_features:  NO_GE = yes

    ! citation: bleiben
    ! paradigm: verb_strong_irreg
    ! stems: inf = bleiben, IMP = blieb, PP_BASE = blieben

    ! citation: verlieren
    ! paradigm: verb_strong_irreg
    ! stems: inf = verlieren, IMP = verlor, PP_BASE = verloren.
    !        SUB1 = verlör
    ! ortho_features: NO_GE
}

! The following paradigm is for strong verbs having a separable prefix

paradigm: verb_strong_pref {
    based_on: verb_strong
    use_for_instances: true
    exemplar: abfahren
```

```
form_sets {
    FINITE = (pres_1s,pres_2s,pres_3s,pres_1p,pres_2p,pres_3p,imp_1s,
    imp_2s,imp_3s,imp_1p,imp_2p,imp_3p)
}
affix_vars {
    sep_prefix = (ab,an,auf,aus,ein,fort,heim,her,hin,mit,nach,nieder,vor,
                  weg,zu,zurück,zusammen)
}
intermediate_forms {
    STRIPPED_INF: LEX
    BASE:  STRIPPED_INF -"en"
    P_PART: +"ge" PP_BASE
}
surface_forms {
    finite_attached: +sep_prefix FINITE
    finite_unattached: FINITE      [unattached = true]

    inf: +sep_prefix STRIPPED_INF
    past_part: +sep_prefix P_PART
}

! The following sample lemmas are provided for purposes of illustration

! citation: abfahren
! paradigm: verb_strong_pref
! stems: inf = abfahren, STRIPPED_INF = fahren, IMP = fuhr, SUB1 = führ
! syntactic_features: sep_prefix = ab

! citation: angehen
! paradigm: verb_strong_pref
! stems: inf = angehen, STRIPPED_INF = gehen, IMP = ging, PP_BASE = gangen
! syntactic_features: sep_prefix = an

! citation: annehmen
! paradigm: verb_strong_pref
! stems: inf = annehmen, STRIPPED_INF = nehmen, PRES_BASE = nimmt,
!        IMP = nahm, PP_BASE = nommen, SUB1 = nähm
! syntactic_features: sep_prefix = an
}
```

APPENDIX III

```
! This file represents the inflectional paradigms for French

para_set_name: french

! Form features and their range of values

feature_values {
        temps = (présent, past, imparfait, futur, conditionnel,
                 sub_présent, sub_imparfait, part_présent, part_passé)
        personne = (1, 2, 3)
        nombre = (singulier, pluriel)
        genre = (masculin, féminin)
}

! Universal orthographic rules

sets {
    LETTER = (A,B,C,D,E,F,G,H,I,J,K,L,M,N,O,P,Q,R,S,T,U,V,W,X,Y,Z,É,È,À,Ê,Û,Ô,Î,Ë,Ï,Ç)
    CONS = (B,C,D,F,G,H,J,K,L,M,N,P,Q,R,S,T,V,W,X,Z,Ç)
    VOW = (A,E,I,O,U,É,È,À,Ê,Û,Ô,Î,Ë,Ï)
    GEM_CONS = (L,N,S,T)
    E_I = (E,È,É,I)
    NON_E_I = (A,O,U)
    NON_E_VOWEL = (A,Â,I,O)
    A_O = (A,O)
    T_CONS = (C,D,T)
}
vars {
    VOW         vowel
    GEM_CONS    gcons
    LETTER      char
    CONS        const
    E_I         e_or_i
    NON_E_I     a_o_u
    NON_E_VOWEL non_e
    A_O         a_or_o
    T_CONS      c_d_t
}
ortho_rules {
    ! geminate the consonant preceding a mute-e syllable
    SUFFIX (GEM) [vowel gcons] +["E#"] --> [vowel gcons gcons "E#"]

    ! geminate the consonant preceding a mute-e syllable
    SUFFIX (GEM) [vowel gcons] +["ES"] --> [vowel gcons gcons "ES"]

    ! geminate the consonant preceding a mute-e syllable
    SUFFIX (GEM) [vowel gcons] +["ENT"] --> [vowel gcons gcons "ENT"]

    ! geminate the consonant preceding a mute-e syllable
    SUFFIX (GEM) [vowel gcons "ER"] +[char] --> [vowel gcons gcons "ER" char]

    ! avoid adjacent mute-e syllables with accent grave
    SUFFIX (~GEM) ["E" const] +["E#"] --> ["È" const "E#"]

    ! avoid adjacent mute-e syllables with accent grave
    SUFFIX (~GEM) ["E" const] +["ES"] --> ["È" const "ES"]
```

```
! avoid adjacent mute-e syllables with accent grave
SUFFIX (~GEM) ["E" const] +["ENT"] --> ["È" const "ENT"]

! avoid adjacent mute-e syllables with accent grave
SUFFIX (~GEM) ["E" const "ER"] +[char] --> ["È" const "ER" char]

! transform é to è before a mute-e syllable
SUFFIX ["É" const] +["E#"] --> ["È" const "E#"]

! transform é to è before a mute-e syllable
SUFFIX ["É" const] +["ES"] --> ["È" const "ES"]

! transform é to è before a mute-e syllable
SUFFIX ["É" const] +["ENT"] --> ["È" const "ENT"]

! keep a soft c soft
SUFFIX ["CER"] -["ER"] --> ["Ç"]

! remove the soft marker from a c when adding E or I
SUFFIX ["Ç"] +[e_or_i] --> ["C" e_or_i]

! keep a soft g soft
SUFFIX ["GER"] -["ER"] --> ["GE"]

! remove the soft marker from a g when adding E or I
SUFFIX ["GE"] +[e_or_i] --> ["G" e_or_i]

! transform y to i in base stem
SUFFIX [a_o_u "YER"] -["ER"] --> [a_o_u "I"]

! change the i back to y in absence of mute e
SUFFIX [a_o_u "I"] +[non_e] --> [a_o_u "Y" non_e]

! change the i back to y in absence of mute e
SUFFIX [a_o_u "I"] +["EZ"] --> [a_o_u "YEZ"]

! maintain y in base stem--this makes explicit the default so that for
! verbs ending in 'ayer' both alternative spellings are generated
SUFFIX ["AYER"] -["ER"] --> ["AY"]

! change a final f to v in the feminine forms of adjectives
SUFFIX ["F"] +["E"] --> ["VE"]

! change a final x to s in the feminine forms of adjectives
SUFFIX ["X"] +["E"] --> ["SE"]

! change -al to -aux when adding s
SUFFIX (S_TO_X) ["AL"] +["S"] --> ["AUX"]

! change -au/-ou to -aux/-oux when adding s
SUFFIX (S_TO_X) [a_or_o "U"] +["S"] --> [a_or_o "UX"]

! change -ail to -aux when adding s
SUFFIX (S_TO_X) ["AIL"] +["S"] --> ["AUX"]

! do not add the final t to 3rd person sing if stem ends in c, d or t
```

```
    SUFFIX [c_d_t] +["T"] --> [c_d_t]
}
! Verb rules

! The following paradigm represents the root for verb paradigms.

paradigm: verb_root {
    use_for_instances: true.
    exemplar: couvrir

    intermediate_forms {
        BASE: INF -"ir"
        IMP: prés_1p -"ons"
        PRÉS_SUB: prés_3p -"ent"
        FUT: inf                            /allow_lexical_override
        PAS: BASE +"i"
        PAS_P: BASE +"Î"
    }
    surface_forms {
        inf: LEX

        prés_1s: BASE +"e"
        prés_2s: BASE +"es"
        prés_3s: BASE +"e"
        prés_1p: BASE +"ons"
        prés_2p: BASE +"ez"
        prés_3p: BASE +"ent"

        passé_1s: PAS +"s"
        passé_2s: PAS +"s"
        passé_3s: PAS +"t"
        passé_1p: PAS_P +"mes"
        passé_2p: PAS_P +"tes"
        passé_3p: PAS +"rent"

        imp_1s: IMP +"ais"
        imp_2s: IMP +"ias"
        imp_3s: IMP +"ait"
        imp_1p: IMP +"ions"
        imp_2p: IMP +"iez"
        imp_3p: IMP +"aient"

        fut_1s: FUT +"ai"
        fut_2s: FUT +"as"
        fut_3s: FUT +"a"
        fut_1p: FUT +"ons"
        fut_2p: FUT +"ez"
        fut_3p: FUT +"ont"

        con_1s: FUT +"ais"
        con_2s: FUT +"ais"
        con_3s: FUT +"ait"
        con_1p: FUT +"ions"
        con_2p: FUT +"iez"
        con_3p: FUT +"aient"

        sub_prés_1s: PRÉS_SUB +"e"
```

```
    sub_prés_2s: PRÉS_SUB +"es"
    sub_prés_3s: PRÉS_SUB +"e"
    sub_prés_1p: IMP +"ions"
    sub_prés_2p: IMP +"iez"
    sub_prés_3p: PRÉS_SUB +"ent"

    sub_imp_1s: PAS +"sse"
    sub_imp_2s: PAS +"sses"
    sub_imp_3s: PAS_P +"t"
    sub_imp_1p: PAS +"ssions"
    sub_imp_2p: PAS +"ssiez"
    sub_imp_3p: PAS +"ssent"

    part_prés: IMP +"ant"
    part_passé_masc_s: PAS
    part_passé_masc_p: part_passé_masc_s +"s"
    part_passé_fém_s: part_passé_masc_s +"e"
    part_passé_fém_p: part_passé_masc_s +"es"
}
form_features {
    prés_1s [temps = présent, personne = 1, nombre = singulier]
    prés_2s [temps = présent, personne = 2, nombre = singulier]
    prés_3s [temps = présent, personne = 3, nombre = singulier]
    prés_1p [temps = présent, personne = 1, nombre = pluriel]
    prés_2p [temps = présent, personne = 2, nombre = pluriel]
    prés_3p [temps = présent, personne = 3, nombre = pluriel]

    passé_1s [temps = past, personne = 1, nombre = singulier]
    passé_2s [temps = past, personne = 2, nombre = singulier]
    passé_3s [temps = past, personne = 3, nombre = singulier]
    passé_1p [temps = past, personne = 1, nombre = pluriel]
    passé_2p [temps = past, personne = 2, nombre = pluriel]
    passé_3p [temps = past, personne = 3, nombre = pluriel]

    imp_1s [temps = imparfait, personne = 1, nombre = singulier]
    imp_2s [temps = imparfait, personne = 2, nombre = singulier]
    imp_3s [temps = imparfait, personne = 3, nombre = singulier]
    imp_1p [temps = imparfait, personne = 1, nombre = pluriel]
    imp_2p [temps = imparfait, personne = 2, nombre = pluriel]
    imp_3p [temps = imparfait, personne = 3, nombre = pluriel]

    fut_1s [temps = futur, personne = 1, nombre = singulier]
    fut_2s [temps = futur, personne = 2, nombre = singulier]
    fut_3s [temps = futur, personne = 3, nombre = singulier]
    fut_1p [temps = futur, personne = 1, nombre = pluriel]
    fut_2p [temps = futur, personne = 2, nombre = pluriel]
    fut_3p [temps = futur, personne = 3, nombre = pluriel]

    con_1s [temps = conditionnel, personne = 1, nombre = singulier]
    con_2s [temps = conditionnel, personne = 2, nombre = singulier]
    con_3s [temps = conditionnel, personne = 3, nombre = singulier]
    con_1p [temps = conditionnel, personne = 1, nombre = pluriel]
    con_2p [temps = conditionnel, personne = 2, nombre = pluriel]
    con_3p [temps = conditionnel, personne = 3, nombre = pluriel]

    sub_prés_1s [temps = sub_présent, personne = 1, nombre = singulier]
    sub_prés_2s [temps = sub_présent, personne = 2, nombre = singulier]
```

```
        sub_prés_3s [temps = sub_présent, personne = 3, nombre = singulier]
        sub_prés_1p [temps = sub_présent, personne = 1, nombre = pluriel]
        sub_prés_2p [temps = sub_présent, personne = 2, nombre = pluriel]
        sub_prés_3p [temps = sub_présent, personne = 3, nombre = pluriel]

        sub_imp_1s [temps = sub_imparfait, personne = 1, nombre = singulier]
        sub_imp_2s [temps = sub_imparfait, personne = 2, nombre = singulier]
        sub_imp_3s [temps = sub_imparfait, personne = 3, nombre = singulier]
        sub_imp_1p [temps = sub_imparfait, personne = 1, nombre = pluriel]
        sub_imp_2p [temps = sub_imparfait, personne = 2, nombre = pluriel]
        sub_imp_3p [temps = sub_imparfait, personne = 3, nombre = pluriel]

        part_prés [temps = part_présent]

        part_passé_masc_s [temps = part_passé, genre = masculin, nombre = singul
        part_passé_masc_p [temps = part_passé, genre = masculin, nombre = plurie
        part_passé_fém_s [temps = part_passé, genre = féminin, nombre = singulie
        part_passé_fém_s [temps = part_passé, genre = féminin, nombre = pluriel]
    }

    ! The following sample lemmas are provided for purposes of illustration

    ! citation: couvrir
    ! paradigm: verb_root
    ! stems: inf = couvrir, part_passé_masc_s = couvert
    ! features:

    ! citation: cueillir
    ! paradigm: verb_root
    ! stems: inf = cueillir
    ! features:
}
! The following paradigm is for all regular 1st conjugation (er) verbs

paradigm: verb_er {
    based_on: verb_root
    use_for_instances: true
    exemplar: regarder

    intermediate_forms {
        BASE: inf -"er"
        PAS: BASE +"a"
        PAS_P: BASE +"Â"
    }

    surface_forms {
        passé_1s: PAS +"i"
        passé_3s: PAS
        passé_3p: BASE +"ÈRENT"

        part_passé_masc_s: BASE +"É"
    }

    ! The following sample lemmas are provided for purposes of illustration

    ! citation: jeter
    ! paradigm: verb_er
```

```
    ! stems: INF = jeter
    ! features: GEM = yes

    ! citation: mener
    ! paradigm: verb_er
    ! stems: INF = mener
    ! features:
}

! The following paradigm is for all regular 2nd conjugation (ir) verbs

paradigm: verb_ir {
    based_on: verb_root
    use_for_instances: true
    exemplar: finir

    surface_forms {
        prés_1s: BASE +"is"
        prés_2s: BASE +"is"
        prés_3s: BASE +"it"
        prés_1p: BASE +"issons"
        prés_2p: BASE +"issez"
        prés_3p: BASE +"issent"
    }
    ! The following sample lemma is provided for purposes of illustration

    ! citation: finir
    ! paradigm: verb_ir
    ! stems: INF = finir
    ! features:
}

! The following paradigm is for those 3rd conjugation verbs that end in ir/oir

paradigm: verb_re_ir {
    based_on: verb_root
    use_for_instances: true
    exemplar: sentir

    intermediate_forms {
        PRÉS_P: BASE                      /allow_lexical_override
        PAS: BASE +"i"                    /allow_lexical_override
        PAS_P: BASE +"Î"                  /allow_lexical_override
        PRÉS_S_SUB: prés_3p -"ent"  /allow_lexical_override
    }
    surface_forms {
        prés_1p: PRÉS_P +"ons"
        prés_2p: PRÉS_p +"ez"
        prés_3p: PRÉS_p +"ent"
    }
    ! The following sample lemmas are provided for purposes of illustration

    ! citation: sentir
    ! paradigm: verb_re_ir
    ! stems: inf = sentir, PRÉS_S = sen
    ! features:
```

```
    ! citation: pouvoir
    ! paradigm: verb_re_ir
    ! stems: inf = pouvoir,  BASE = peu, prés_1s = peux, prés_1s = puis,
    !        prés_2s = peux, prés_3p = pouvent, PRÉS_P = pouv,
    !        PAS = pu, PAS_P = pÛ, PRÉS_S_SUB = pui,
    !        sub_prés_1p = puissions, prés_2p = puissiez, FUT = pourr
    ! features:
}

! The following paradigm is for regular 3rd conjugation (-re) verbs

paradigm: verb_re_reg {
    based_on: verb_re_ir
    use_for_instances: true
    exemplar: rompre

    intermediate_forms {
        BASE: inf -"re"                 /allow_lexical_override
        FUT: inf -"e"                   /allow_lexical_override
    }
    surface_forms {
        part_passé_masc_s: BASE +"u"   /allow_lexical_override
    }
    ! The following sample lemmas are provided for purposes of illustration

    ! citation: rompre
    ! paradigm: verb_re_reg
    ! stems: inf = rompre
    ! features:

    ! citation: boire
    ! paradigm: verb_re_reg
    ! stems: inf = boire, PRÉS_P = buv, prés_3p = boivent, PAS = bu,
    !        PAS_P = bû
    ! features:
}

! Adjective rules

! The following paradigm is for all regular adjectives

paradigm: adj_reg {
    use_for_instances: true
    exemplar: brun


    surface_forms {
        masc_sing: LEX
        masc_plural: masc_sing +"s"
        fém_sing: masc_sing +"e"
        fém_plural: masc_sing +"es"
    }
    form_features {
        masc_sing [genre = masculin, nombre = singulier]
        masc_plural [genre = masculin, nombre = pluriel]
        fém_sing [genre = féminin, nombre = singulier]
        fém_plural [genre = féminin, nombre = pluriel]
```

```
    }
    ! The following sample lemma is for purposes of illustration

    ! citation: fluet
    ! paradigm: adj_reg
    ! stems: masc_sing = fluet
    ! features: geminating = yes
}

! The following paradigm is for adjectives that use one form for the masc forms
! and another for the feminine

paradigm: adj_irreg_fém {
    based_on: adj_reg
    use_for_instances: true

    surface_forms {
        fé_sing: LEX
        fém_plural: fé_sing +"s"
    }
    ! The following sample lemma is for purposes of illustration

    ! citation: favori
    ! paradigm; adj_irreg_fém
    ! stems: masc_sing = favori, fé_sing = favorite
    ! features: substantive = yes
}

! Noun paradigms

! The following paradigm is for all regular nouns

paradigm: noun_reg {
    use_for_instances: true
    exemplar: sac

    surface_forms {
        sing: LEX
        pluriel: sing +"s"
    }
    form_features {
        sing [nombre = singulier]
        pluriel [nombre = pluriel]
    }
    ! The following sample lemma is for purposes of illustration

    ! citation: hibou
    ! paradigm: noun_reg
    ! stems: sing = hibou
    ! features: genre = masculin, S_to_X = yes
}

! The following paradigm is for nouns having different stems for the singular
! and plural

paradigm: noun_irreg_pluriel {
    based_on: noun_reg
```

```
    use_for_instances: true

    surface_forms {
        pluriel: LEX
    }
    ! The following sample lemma is for purposes of illustration

    ! citation: madame
    ! paradigm: noun_irreg_pluriel
    ! stems: sing = madame, pluriel = mesdames
    ! features: genre = féminin
}

! The following paradigm is for those nouns having the same form for both
! the singular and plural forms, eg, arbat-jour

paradigm: noun_invar {
    based_on: noun_reg
    use_for_instances: true

    surface_forms {
        pluriel: sing
    }
    ! The following sample lemma is for purposes of illustration

    ! citation: porte-monnaie
    ! paradigm: noun_invar
    ! stems: sing = porte-monnaie
    ! features: gender = masculin
}

! The following paradigm is for nouns that have no singular, eg, lazzi

paradigm: noun_no_sing {
    based_on: noun_irreg_pluriel
    use_for_instances: true

    surface_forms {
        sing: NIL
    }
    ! The following sample lemma is for purposes of illustration

    ! citation: cisailles
    ! paradigm: noun_no_sing
    ! stems: pluriel = cisailles
    ! features: gender = féminin
}
```

APPENDIX IV

MORPH COMPILER ALGORITHM OVERVIEW

```
/* Takes an M language description for some natural language and creates a
run-time data structure for use in morphological analysis and generation. */

1) Build a tree of paradigms, with each paradigm that is based on another
   paradigm located as a child of the paradigm it is based upon. Store the
   form rules declared within each paradigm along with the paradigm.

2) For each form rule (FR) in the tree
      {make a list of all the paradigms which share it
       store the list with the FR
      }

3) For each FR1 in the tree
      {if the stem in the right-hand side (RHS) of FR1 is a form
         {/* identify all FR's that might create the stem */
          S = the set of FR's that correspond to that form (i.e., which have
                that form name as their left-hand side)
          for each FR in S
             {if the intersection of the paradigms that share FR and those
                that share FR1 is not NULL
                  add FR, along with the list of the intersecting paradigms,
                   to the set of RHS stem FR's for FR1
                  /* Note that the number of paradigms will be > 1 only in
                     those cases where there is a "divergence", i.e., an
                     intermediate form rule within the chain has been
                     superceded by a subparadigm that shares FR1 */
             }
         }
      }

4) For each paradigm
      for each FR the RHS of which contains the name of a form set
         replace FR with a set of FR's, one for each member of the form set

5) For each surface FR1
      {check for cycles in FR1's "chain" of FR'
       propagate features back up the chain if the FR operator is a plus (+)
      }

6) For each orthographic rule (OR)
      {S = the set of FR's that match (ie, are described by) the OR, in terms
          of affix, affix type (suffix/prefix) and operator (+/-)
       for each FR1 in S
          {/* create a pair of FR's the "outer" one of which is associated
              with FR1 as a variant */
           create the "inner" FR such that the RHS stem is that of FR1, the
              RHS affix is the OR context, the operator is a minus and the
              type is intermediate FR
           create the "outer" FR such that the RHS stem is the newly created
              "inner" FR, the RHS affix is the OR result into which the form
              rule affix has been unified, the operator is a plus, and
              associated with it are all other data associated with FR1 (eg,
              feature specification, override attribute, etc)
           if OR has a parameter
              associate parameter with the newly created outer FR
```

```
        add outer FR to FR1's set of variants
       }
    }
```

7) Build a character discrimination net for all surface form rules in which the RHS affix is of type suffix and the operator is a plus (+)

We claim:

1. A computer implemented method for performing morphological analysis in a computer system by describing inflectional operations on a natural language, the computer system comprising an input device, a memory and a computer processor capable of manipulating a data structure, the natural language comprising sequences of surface strings encoding grammatical properties, the computer implemented method comprising the steps of:

a. providing a language syntax that defines statement forms for statements that describe the inflectional morphology of the natural language;

b. accepting as input at the input device, which is coupled to the computer processor, a set of language statements that follow said language syntax to describe the inflectional morphology of the natural language, said input comprising rule statements:

i. defining a set of morpho-syntactic features corresponding to grammatical distinctions within the parts of speech categories in the natural language;

ii. defining a set of inflectional morphological paradigms, said inflectional morphological paradigms comprising form rule statements to describe the construction of word forms and associate with each construction pre-selected ones of said morpho-syntactic features, said form rule statements comprising stem and affix components that describe the inflectional morphology corresponding to grammatical construction rules commonly known in the natural language;

iii. defining a lexicon, said lexicon containing a set of word entries containing representative forms of each word of a language that are associated to a preselected one of said inflectional morphological paradigms;

c. creating a computer-manipulatable data structure from the set of language statements; and d. performing a morphological analysis utilizing said computer-manipulatable data structure.

2. The computer implemented method of claim 1 comprising the following additional steps:

a. providing, in the language syntax, statements forms for the declaration of orthographic rules of the natural language, to specify spelling changes that apply to form rules across paradigms, the statements forms defining an orthographic rule having a right-hand-side and a left-hand-side, left-hand-side identifying a context in which the orthographic rule is to apply and a right-hand-side declaring the construction of the resulting orthographic form; and b. accepting as input to the computer processor, a second set of language statements that declare an orthographic rule according to the language syntax.

3. The computer implemented method of claim 2 comprising the following additional steps of:

a. providing, in the language syntax, statement forms for an orthographic rule declaration defining a parameter that limits application of the orthographic rule to words in a natural language whose lexicon entries contain an indicator with a corresponding parameter set to on;

b. accepting as input to the computer processor, a declaration of an orthographic rule with a parameter; and c. accepting as input to the computer processor, a lexicon entry for a word with a parameter indicator set to on.

4. The computer implemented method of claim 1 comprising the following additional steps:

a. providing, in the language syntax, statement forms to indicate that the form rules of a first paradigm are inherited by a second paradigm; and b. accepting as input to the computer processor a language statement in the language syntax defining that the form rules of the first paradigm are inherited by the second paradigm.

5. The computer implemented method of claim 1 or claim 4 comprising the following additional steps:

a. providing in the language syntax a statement forms to indicate that the statements of the first paradigm inherited by the second paradigm are superseded by declaring a form rule in the second paradigm, covering a form that is also covered in the form rules inherited from the first paradigm; and b. accepting as input to the computer processor a language statement defining the form rule in the second paradigm covering a form for which there is a form rule in the first paradigm.

6. The computer implemented method of claim 1 comprising the following additional steps:

a. providing in the language syntax a statement form to provide that each form rule comprises a left-hand-side and a right-hand-side, said left-hand-side comprising a form rule identifier and said right-hand-side comprising the stem and affix components that defines the inflectional morphology corresponding to known natural language construction rules and one of a set of operators, the set comprising a plus (+) operator and a minus (−) operator, the plus operator indicating the concatenation of affix and stem and the minus operator indicating the removal of affix from string; and b. accepting as input to the computer processor a language statement declaring a form rule using a left-hand-side identifier and a right-hand side component description.

7. The computer implemented method of claim 1 or claim 6 comprising the following additional steps:

a. providing in the language syntax a statement form to provide that a stem component on the right-hand-side of a form rule can be the left-hand-side identifier for another form rule; and b. accepting as input to the computer processor a language statement declaring a form rule wherein the right-hand-side stem component of the form rule is the left-hand-side identifier of the other form rule.

8. The computer implemented method of claim 1 or claim 6 comprising the following additional steps:

a. providing in the language syntax a statement form to provide that a stem component on the right-hand-side of a form rule can be a reference to a string form in the lexicon; and b. accepting as input to the computer processor a language statement declaring a form rule wherein the right-hand-side stem component of the form rule references a string form in the lexicon.

9. The computer implemented method of claim 1 comprising the following additional steps:

a. providing in the language syntax a statement form to provide that form rules can be declared as either a surface form rule or an intermediate form rule;

b. accepting as input to the computer processor a language statement declaring an intermediate form rule; and c. accepting as input to the computer processor a language statement declaring a surface form rule wherein the right-hand-side stem of the surface form rule is the left-hand-side identifier of the intermediate form rule.

10. The computer implemented method of claim 9 wherein the right-hand-side stem of the intermediate form rule is the left-hand-side identifier of the surface form rule.

11. The computer implemented method of claim 1 and comprising the following additional steps:

a. providing, in the language syntax, a provision wherein a lexical override feature determines that the construction statements of a form rule are overridden by an identified character string in the lexicon if the lexicon entry for the corresponding word has a corresponding lexicon override form in the entry; and b. accepting as input to the computer processor and storing in the lexicon data entry for a word, a representative form identified for lexical override use.

12. The computer implemented method of claim 11 wherein the provision of a lexical override feature is applied automatically to surface form rules.

13. The computer implemented method of claim 11 comprising the following additional steps:

a. providing, in the language syntax a statement form to indicate in a form rule that a lexical override feature determines that the construction features of a form rule are overridden by an identified character string in the lexicon, if the lexicon entry for the corresponding word has a corresponding lexicon override form in the entry; and b. accepting as input to the computer processor, a language statement declaring a form rule additionally containing a lexical override declaration.

14. The computer implemented method of claim 1 comprising the following additional steps:

a. accepting as input to the computer processor a plurality of form rule declarations;

b. providing in the language syntax a statement form to provide that a set of form rules identify a variable; and c. accepting as input to the computer processor a declaration of a form rule wherein the stem of the form rule is an identifier for a form set.

15. The computer implemented method of claim 1 comprising the following additional steps:

a. providing, in the language syntax, a statement form to provide that a set of affix strings can be identified by a variable;

b. accepting as input to the computer processor a language statement declaring a variable and a set of affix strings over which that variable may range; and c. accepting as input to the computer processor a form rule wherein the affix component is the variable identifying a set of affix strings.

16. For use in computer-based morphological text analysis of natural languages, a computer implemented method for creating a data structure for computer-based generating and recognizing of word forms in a natural language, the method comprising the steps of:

a. providing a morphological description of a natural language stored in a memory device, said description comprising statements in a morphological description language, said morphological description language comprising statements arranged according to a predetermined syntax, said syntax permitting the specification of inflectional morphologic paradigms, said morphologic paradigms comprising form rules including surface form rules and intermediate form rules, said form rules comprising a left-hand-side identifier and a right-hand-side specifying a word stem and the concatenation or removal of an affix, including a prefix or a suffix, said stems and affixes comprising strings of characters, said syntax capable of specifying that the form rules of one paradigm are inherited by another paradigm, said syntax permitting the stem of any form rule that does not contain a form set reference to be the left-hand-side identifier of another form rule, said syntax permitting the stem in a form rule to be a reference to a string in the lexicon, said syntax permitting a form set variable to identify a plurality of left-hand-side form rule identifiers and the form set variable to be used as the stem in the right hand side of a form rule, said syntax permitting an affix set variable to identify a set of affix strings with the affix set variable being used as an affix in a right-hand-side of a form rule;

b. disambiguating the stem components of the right-hand-sides of the form rules in each paradigm, said disambiguation process comprising the steps of:

i. determining in each form rule whether the stem component is an identifier of another form rule;

ii. replacing each stem component that is an identifier with a link to the identified form rule;

c. determining for each paradigm whether there is a declaration stating that the paradigm inherits the form rules of another parent paradigm;

d. creating form rules for the paradigms that will inherit the form rule from a parent paradigm by sharing references to the rules of the parent paradigm;

e. replacing in the memory device, for each form rule that contains a right-hand-side reference to a form set, the form rule with a set of form rules, one for each form in the corresponding form set, each created form rule corresponding to the form set rule containing the right-hand-side reference to the form set;

f. checking each surface form for cycles, said cycle check process comprising the steps of:

i. creating a cycle check list initialized to empty;

ii. locating a surface form rule;

iii. checking stem components on the right-hand-side to determine if the stem is an identifier to another form rule;

iv. comparing the stem that is an identifier of another form rule to the entries on the cycle check list;

v. adding the stem that is an identifier to the cycle check list unless the identifier is included in the cycle check list;

vi. checking the form rule referenced by the identifier for cycles;

g. providing a set of orthographic rules;

h. conflating the set of orthographic rules, said process of conflation comprising the steps of:

i. finding the set of form rules that match an orthographic rule in the set of orthographic rules in terms of operator type, affix and affix type;

ii. creating an inner form rule variant, the form rule variant comprising the stem form rule from the RHS of the matching form rule as the RHS stem and as the affix, an affix sequence comprising character strings and string variables, indicating the correct context determined by the orthographic rule, and as the operator a minus; and iii. creating an outer form rule variant, said outer form rule variant comprising a newly created outer form rule as the right-hand-side stem and as the affix, an affix sequence comprising character strings and string variables, indicating the correct spelling as determined by the orthographic rule and as the operator a plus.

17. For use in performing morphological analysis in a computer system, morphological analysis comprising inflectional operation on words found in a natural language, the computer system comprised of hardware and software elements capable of manipulating a data structure stored in a memory storage device, a method for creating a computer-manipulatable data structure, the method comprising the steps of:

a. providing a syntax for a description of the inflectional morphology of a natural language, said description comprising a set of statements made according to the syntax;

b. accepting as input to the computer system a set of statements for the description of the inflectional morphology, the set of statements specified according to the syntax; and c. creating a computer-manipulatable data structure, using the set of statements made according to the syntax the data structure comprising a set of interconnected nodes, said nodes comprising information on the statements of the natural language and the nodes being linked by a hierarchical structure and a plurality of interconnecting references.

18. For use in a computer-based morphological text analyzer used to analyze inflected word forms in a natural language, a data structure coupled to and used in conjunction with morphological text analyzer modules, said data structure stored in a memory storage device and comprising:

a. a computer-manipulatable data structure comprising a hierarchical tree with interconnected nodes, the nodes containing computer-manipulatable information concerning the inflectional morphology of a natural language, wherein the computer-manipulatable data structure is created from a mapping of a high-level description of the inflectional morphology of a natural language; said high-level language comprising a syntax to provide for the specification of inflectional paradigms; the mapping being a compiling process to transform a set of statements of the high-level language into the computer-manipulatable data structure; and b. a lexicon comprising a set of word entries, each word entry comprising inflection information for a word of the natural language.

* * * * *